(12) United States Patent
Suzuki et al.

(10) Patent No.: US 9,478,933 B2
(45) Date of Patent: Oct. 25, 2016

(54) WAVELENGTH DETECTOR AND WAVELENGTH CALIBRATION SYSTEM

(75) Inventors: Toru Suzuki, Tochigi (JP); Shinichi Matsumoto, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 709 days.

(21) Appl. No.: 13/535,641

(22) Filed: Jun. 28, 2012

(65) Prior Publication Data
US 2013/0170508 A1 Jul. 4, 2013

(30) Foreign Application Priority Data

Jul. 6, 2011 (JP) ................................ 2011-150373
May 17, 2012 (JP) ................................ 2012-113836

(51) Int. Cl.
| | | |
|---|---|---|
| H01S 3/13 | (2006.01) | |
| G01J 1/42 | (2006.01) | |
| H01S 3/137 | (2006.01) | |
| H01S 3/225 | (2006.01) | |
| G01J 9/00 | (2006.01) | |
| G01J 9/02 | (2006.01) | |

(Continued)

(52) U.S. Cl.
CPC .................. *H01S 3/13* (2013.01); *G01J 1/429* (2013.01); *G01J 9/00* (2013.01); *G01J 9/0246* (2013.01); *H01J 47/00* (2013.01); *H01S 3/137* (2013.01); *H01S 3/225* (2013.01); *H01S 3/08004* (2013.01); *H01S 3/08009* (2013.01); *H01S 3/10069* (2013.01); *H01S 3/1303* (2013.01)

(58) Field of Classification Search
CPC .................................... H01S 3/13; G01J 1/42
USPC ............................................. 250/372; 372/5
See application file for complete search history.

(56) References Cited

U.S. PATENT DOCUMENTS 3,982,124 A * 9/1976 Schoon ..................... 250/237 R
4,905,243 A 2/1990 Lokai et al.
(Continued)

FOREIGN PATENT DOCUMENTS

EP 0992093 B1 4/2000
JP H01-101682 4/1989
(Continued)

OTHER PUBLICATIONS

Office Action dated Feb. 23, 2016 issued in counterpart Japanese application No. 2012-113836, with English translation.

*Primary Examiner* — David Porta
*Assistant Examiner* — Gisselle Gutierrez
(74) *Attorney, Agent, or Firm* — Kratz, Quintos & Hanson, LLP

(57) ABSTRACT

The wavelength detector includes a diffusion element that diffuses the laser beam; a light collection optical system provided downstream from the diffusion element; a member, including an aperture, provided downstream from the light collection optical system; a discharge tube that is provided downstream from the member and that includes a cylindrical anode and a cylindrical cathode that each have a through-hole formed therein, and that is configured so that an electrical property between the anode and the cathode changes due to an opto-galvanic effect when a laser beam having a predetermined wavelength passes through the through-hole of the cathode in a state in which a DC voltage is applied to the anode; and a high-voltage DC power source. The discharge tube is disposed so that the laser beam that passes through the aperture passes through the through-hole of the cathode of the discharge tube without directly irradiating the cathode.

20 Claims, 14 Drawing Sheets

(51) Int. Cl.
*H01J 47/00* (2006.01)
*H01S 3/08* (2006.01)
*H01S 3/10* (2006.01)

(56) References Cited

U.S. PATENT DOCUMENTS

| | | | |
|---|---|---|---|
| 5,450,207 A * | 9/1995 | Fomenkov | 356/416 |
| 6,084,893 A | 7/2000 | Choi et al. | |
| 6,546,037 B2 * | 4/2003 | Stamm et al. | 372/57 |
| 6,646,717 B2 * | 11/2003 | Ota et al. | 355/67 |
| 6,750,972 B2 | 6/2004 | Sandstrom | |
| 2003/0137672 A1 | 7/2003 | Moriya et al. | |
| 2005/0169341 A1 * | 8/2005 | Bergmann | H01S 3/097 372/81 |
| 2010/0110407 A1 * | 5/2010 | Kobayashi | 355/71 |

FOREIGN PATENT DOCUMENTS

| | | |
|---|---|---|
| JP | H09-190967 A | 7/1997 |
| JP | H10-506185 A | 6/1998 |
| JP | H11-298084 A | 10/1999 |
| JP | 2003-214958 | 7/2003 |
| JP | 2005-530352 A | 10/2005 |
| WO | WO 99/01890 | 1/1999 |

* cited by examiner

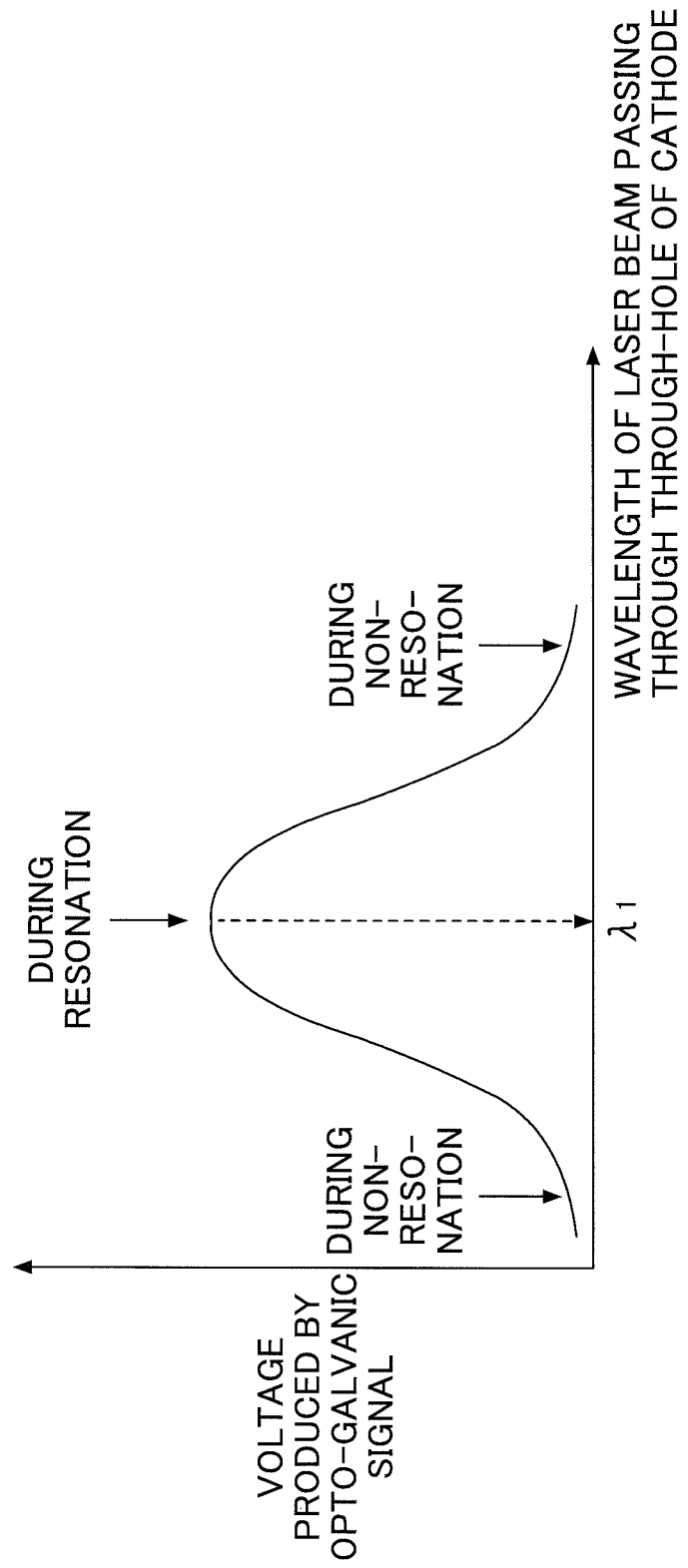

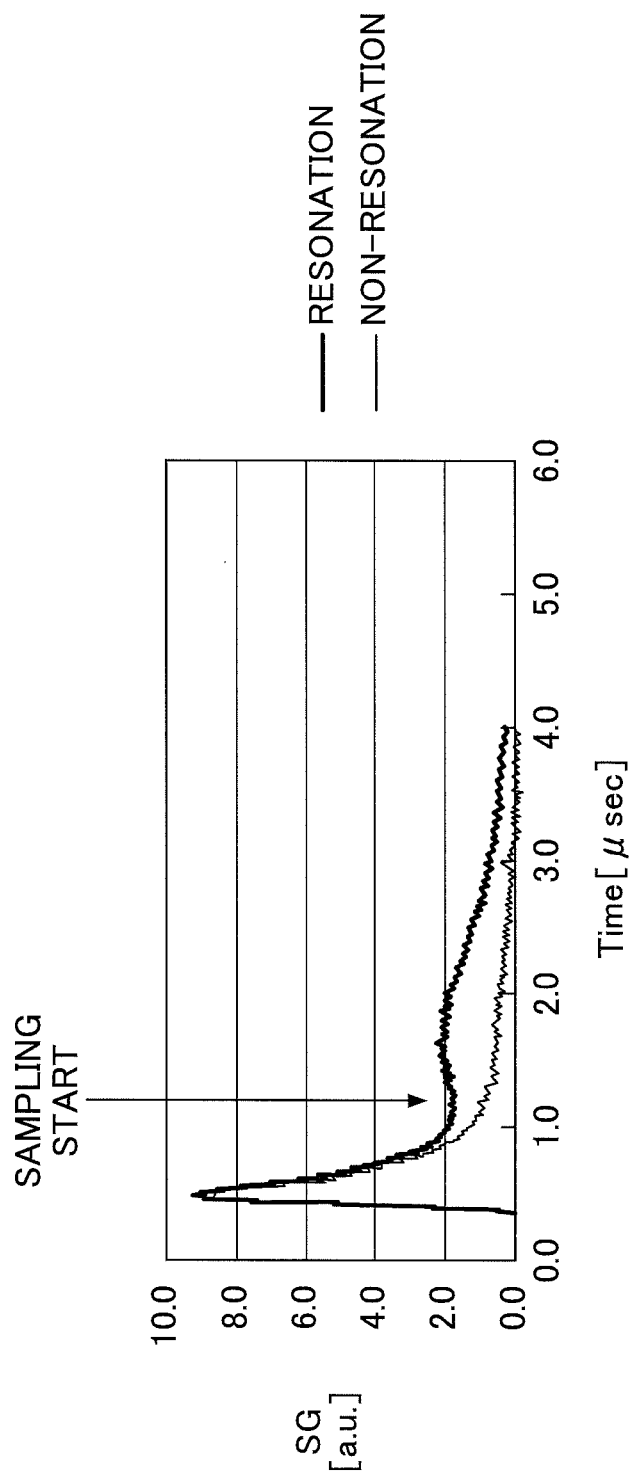

WAVELENGTH DETECTOR AND WAVELENGTH CALIBRATION SYSTEM

CROSS-REFERENCE TO RELATED APPLICATION

The present application claims priority from Japanese Patent Application No. 2011-150373 filed Jul. 6, 2011 and Japanese Patent Application No. 2012-113836 filed May 17, 2012.

BACKGROUND

1. Technical Field

The present disclosure relates to apparatuses for generating ultra violet light.

2. Related Art

The miniaturization and increased levels of integration of semiconductor integrated circuits have led to a demand for increases in the resolutions of semiconductor exposure devices. Semiconductor exposure devices will be referred to simply as "exposure devices" herein after. Accordingly, advances are being made in the reduction of the wavelengths of light outputted from exposure light sources. G as laser devices are being used as exposure light sources instead of conventional mercury lamps. At present, a KrF excimer laser device that outputs ultra violet light having a wavelength of 248 nm and an ArF excimer laser device that outputs ultra violet light having a wavelength of 193 nm are being used as gas laser devices for exposure.

Immersion exposure, in which the apparent wavelength of an exposure light source is reduced by filling a gap between the projection lens of an exposure device and a wafer with a liquid and changing the refractive index of the gap, is being researched as a next-generation exposure technique. In the case where immersion exposure is carried out using an ArF excimer laser device as the exposure light source, the wafer is irradiated with ultra violet light having a wavelength of 134 nm within the liquid. This technique is called ArF immersion exposure. ArF immersion exposure is also sometimes called "ArF immersion lithography".

Because the spectral line width when a KrF or ArF excimer laser device oscillates naturally is wide at approximately 350 to 400 pm, chromatic aberration occurs in the laser beam (ultra violet light) projected in a reduced manner onto the wafer by the projection lens in the exposure device, which in turn causes the resolution to drop. Accordingly, it is necessary to narrow the spectral line width of the laser beam outputted from the gas laser device until the chromatic aberration reaches a level that can be ignored. The spectral line width is also sometimes called the "spectral width". For this reason, a line narrow module having a line narrowing element is provided within the laser resonator of the gas laser device, and the narrowing of spectral width is being realized using this line narrow module. Note that the line narrowing element may be an etalon, a grating, or the like. A laser device that narrows the spectral width in this manner is called a narrow-band laser device.

SUMMARY

A wavelength detector according to an aspect is a device that detects a wavelength of a laser beam outputted from an ultra violet laser device, and may include: a diffusion element that diffuses a laser beam; a light collection optical system provided downstream from the diffusion element; a member, including an aperture, provided downstream from the light collection optical system; a discharge tube that is provided downstream from the member and that includes a cylindrical anode and a cylindrical cathode that each have a through-hole formed therein, and that is configured so that an electrical property between the anode and the cathode changes due to an opto-galvanic effect when a laser beam having a predetermined first wavelength passes through the through-hole of the cathode in a state in which a DC voltage is applied to the anode; and a high-voltage DC power source configured so as to apply a DC voltage to the anode. The discharge tube may be disposed so that the laser beam that passes through the aperture passes through the through-hole of the cathode of the discharge tube without directly irradiating the cathode.

A wavelength detector according to another aspect is a device that detects a wavelength of a laser beam outputted from an ultra violet laser device, and may include: a discharge tube that includes a cylindrical anode and a cylindrical cathode that each have a through-hole formed therein, and that is configured so that an electrical property between the anode and the cathode changes due to an opto-galvanic effect when a laser beam having a predetermined first wavelength passes through the through-hole of the cathode in a state in which a DC voltage is applied to the anode; a high-voltage DC power source configured so as to apply a DC voltage to the anode; and a signal processing unit including a signal detection point for detecting a voltage change in a signal level of the cathode. The signal processing unit may include at least one of a low-pass filter connected to the signal detection point for suppressing the detection of a photoelectric effect signal produced when the cathode is irradiated with the laser beam and a delay circuit that delays a signal detection timing in the signal detection point by a predetermined amount of time in order to suppress the detection of the photoelectric effect signal at the signal detection point.

A wavelength calibration system according to an aspect may include: an ultra violet laser device; a wavelength control unit that changes the wavelength of a laser beam outputted from the ultra violet laser device in steps within a predetermined wavelength range; a first wavelength detector that is the aforementioned wavelength detector; and a second wavelength detector that consecutively detects wavelengths of the laser beams outputted from the ultra violet laser device. The wavelength control unit may calculate a calibration value for a wavelength detection value detected by the second wavelength detector based on a difference between the predetermined first wavelength that is a wavelength based on the material of the cathode, and the wavelength detection value that is a wavelength detected by the second wavelength detector when the electrical property of the discharge tube changes.

A wavelength detector according to yet another aspect is a wavelength detector that detects a wavelength of an ultra violet laser beam, and may include: a diffusion element that diffuses the laser beam; a light collection optical system that receives the laser beam from the diffusion element; a member including an aperture through which the laser beam collected by the light collection optical system passes; a discharge tube including a cylindrical anode, a cylindrical cathode, and a receptacle that seals the anode and the cathode; a high-voltage DC power source configured so as to apply a DC voltage to the anode; and an optical system that allows the laser beam that has passed through the aperture to pass through a through-hole of the cathode without directly irradiating the cathode.

BRIEF DESCRIPTION OF DRAWINGS

Exemplary embodiments of the present disclosure will be described herein after with reference to the appended drawings.

FIG. 1C schematically illustrates a relationship between an opto-galvanic signal and a wavelength.

FIG. 5B graphically illustrates change in the voltage of a signal outputted by the other example of a signal processing circuit according to the embodiment.

DESCRIPTION OF EMBODIMENTS

Figure 1A:
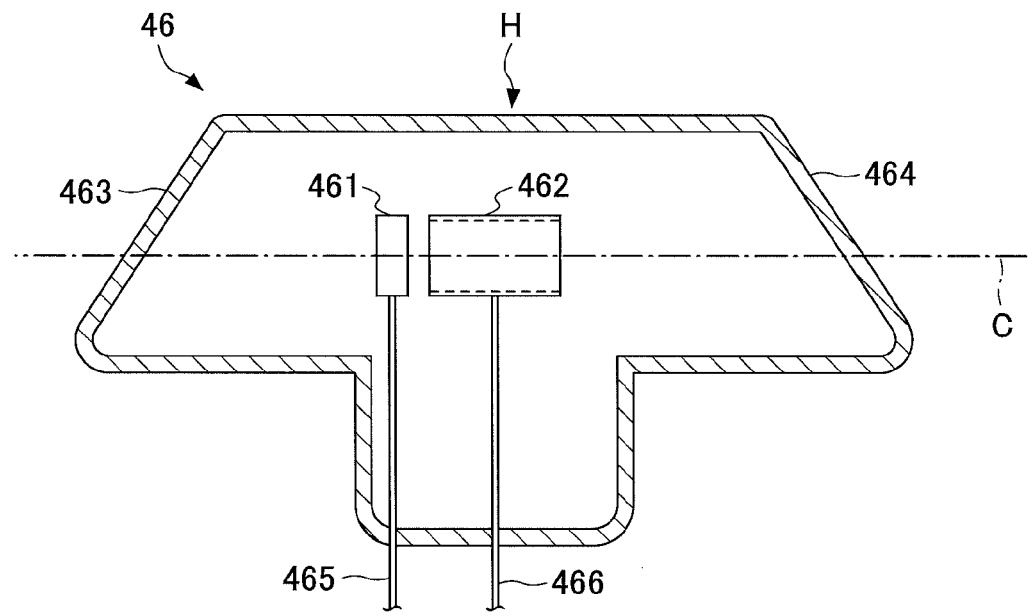
FIG. 1A is a simplified illustration of the partial cross-sectional structure of a Laser Galvatron®type discharge tube.

An embodiment of the present disclosure will be described in detail herein after with reference to the drawings. The embodiment described herein after indicate examples of the present disclosure, and is not intended to limit the content of the present disclosure. Furthermore, not all of the configurations and operations described in the embodiment are required configurations and operations in the present disclosure. Note that identical constituent elements will be given identical reference numerals, and redundant descriptions thereof will be omitted. Note also that in the following descriptions, in the optical path of a laser beam, the side toward the source of the laser beam will be referred to as "upstream", whereas the side toward the target destination of the laser beam will be referred to as "downstream".

The embodiment will be described according to the order of the following items.

1. Outline
2. Description of Wavelength Detector
2.1 Configuration of Optical System
2.2 Operations of Optical System
2.3 First Example of Signal Processing Unit
2.3.1 Configuration
2.3.2 Operations
2.4 Second Example of Signal Processing Unit
2.4.1 Configuration
2.4.2 Operations
3. Description of Wavelength calibration System
3.1 System Configuration
3.2 System Operations 1. Outline An ultra violet laser device according to the present embodiment may be a device for generating a laser beam that is ultra violet light used in exposures performed by an exposure device. In the following descriptions, "laser beam wavelength" may refer to the central wavelength in a spectral intensity distribution of the laser beam.

As an example of the application of the exposure device, there may be a case where the exposure device makes a request, to a laser controller that controls the ultra violet laser device, to supply a laser beam of a wavelength based on a wafer that is to be exposed. In this case, the laser controller may control the ultra violet laser device so as to output a laser beam of the wavelength requested by the exposure device to the exposure device. The control performed by the laser controller may be carried out, for example, as described herein after.

That is, the laser controller may be capable of obtaining a wavelength detection value detected by a wavelength detector, which continuously detects the wavelength of the laser beam outputted to the exposure device. The exposure device may measure the wavelength of the laser beam outputted from the ultra violet laser device, and, based on that measurement value, may calculate a target value for the wavelength of the laser beam to be communicated to the laser controller. Then, the laser controller may take a difference between the stated wavelength detection value and the wavelength target value supplied by the exposure device as an error, and control the ultra violet laser device so that that error approaches zero.

At this time, it is possible that the stated control will not be carried out properly, such as in the case where there has been a drop in the detection precision of the detector that detects the wavelength of the laser beam outputted to the exposure device. As a result, it is possible that the ultra violet laser device cannot output a laser beam having a wavelength corresponding to the target value. Accordingly, a wavelength calibration system including a separate wavelength detector for detecting an absolute wavelength of the laser beam may be provided for the purpose of calibrating the wavelength detection value detected by the wavelength detector that continuously detects the wavelength of the laser beam.

The wavelength detector for detecting the absolute wavelength of the laser beam may include a Laser Galvatron® type discharge tube. In this discharge tube, the electrical properties between an anode and a cathode may change due to an opto-galvanic effect when a laser beam of a predetermined first wavelength passes through a through-hole in the cathode of the discharge tube while a DC voltage is being applied to the anode. An example of a discharge tube having such a structure is disclosed in, for example, International Publication Number No. WO99/01890, which is incorporated herein by reference. In the case of an ArF excimer laser device, the absolute wavelength detected using the discharge tube may be a wavelength that is close to the wavelength of the laser beam of the ArF excimer laser device, for the purpose of obtaining a high wavelength calibration precision. The wavelength of the laser beam of the ArF excimer laser device may include a wavelength in the vicinity of 193 nm.

Although details are given in the aforementioned International Publication Number No. WO99/01890, an outline of the configuration and effects of the stated discharge tube will be described herein after with reference to FIGS. 1A, 1B, and 1C.

FIG. 1A is a diagram showing a simplified illustration of a partial cross-section of the structure of the discharge tube disclosed in the aforementioned International Publication Number No. WO99/01890. As shown in FIG. 1A, a discharge tube 46 may have a T-shaped cross-section, and may include an airtight receptacle H injected with a mixed gas that is a mixture of a gas containing oxygen atoms such as carbon dioxide and an inert gas. The inert gas may be a noble gas such as helium, neon, or the like. A light entry portion 463 into which a laser beam enters and a light output portion 464 from which a laser beam is outputted may be formed in the discharge tube 46. An anode 461 and a cathode 462 may be provided within the airtight receptacle H between the light entry portion 463 and the light output portion 464, along a center axis C. The anode 461 and the cathode 462 may both be cylinders having through-holes through which an entering laser beam passes, and may be disposed so as to be opposed to each other in a concentric manner. As shown in FIG. 1B, a barrel-shaped through-hole 461a may be formed in the anode 461, whereas a barrel-shaped through-hole 462a may be formed in the cathode 462. The cathode 462 may be configured of platinum (Pt). The anode 461 and the cathode 462 may be connected to conductive lead pins 465 and 466, respectively.

When a high voltage is applied to the anode 461 of the discharge tube 46 via the lead pin, a discharge occurs between the anode 461 and the cathode 462, and plasma may be produced by the injected gas within the airtight receptacle H being ionized by the discharge. The surface of the cylindrical cathode 462 may be sputtered by this plasma, and platinum may be released into the discharge plasma in an atomic state. A laser beam of a wavelength that essentially matches the resonance wavelength of the platinum atoms may enter into the discharge plasma that contains the platinum atoms and pass through the through-hole 462a of the cathode 462. As a result, the laser beam may resonate with some of the platinum atoms within the plasma, and may be absorbed by the platinum atoms. The occupation rate of electrons in each level of atoms in the discharge plasma may change as a result of the absorption caused by the resonance, and a change in the electrical properties between the anode 461 and the cathode 462 may occur due to that change. The electrical properties may, for example, correspond to impedance. The change in the electrical properties is referred to as the "opto-galvanic effect". The change in the electrical properties may be thought of as a result of the platinum within the discharge plasma being ionized from a vaporous state due to the resonance of the discharge plasma caused by the laser beam. Here, in the case where the cathode 462 is configured of platinum as described above, the wavelength of the laser beam for causing the discharge plasma to resonate may be 193.4369 nm. A wavelength of 193.4369 nm, for example, may be taken as the first wavelength. Accordingly, a configuration in which platinum is used in the cathode 462 may be preferable for wavelength calibration in an ArF excimer laser device that outputs a laser beam having a wavelength near 193 nm. The material of which the cathode is configured may be selected in accordance with the wavelength of the laser beam. For example, a configuration in which iron (Fe) is used in the cathode 462 may be preferable for wavelength calibration in a KrF excimer laser device that outputs a laser beam having a wavelength near 248 nm.

As a representative example of a method for detecting resonance in discharge plasma caused by a laser beam, a voltage signal or a current signal in a signal detection point for detecting a change in the voltage of the cathode 462 may be observed while applying a high-voltage DC power source to the anode 461. The signal observed at this signal detection point may be referred to as an opto-galvanic signal in the following descriptions. A change in the impedance between the anode 461 and the cathode 462 resulting from the resonance in the discharge plasma caused by the laser beam may instigate a change in the opto-galvanic signal. For example, as shown in FIG. 1C, resonance may occur between the laser beam and the discharge plasma when the wavelength of the laser beam that passes through the cathode in the discharge tube is a specified wavelength $\lambda_1$, and the voltage value of the opto-galvanic signal at the wavelength $\lambda_1$ may be a peak.

Figure 1B:
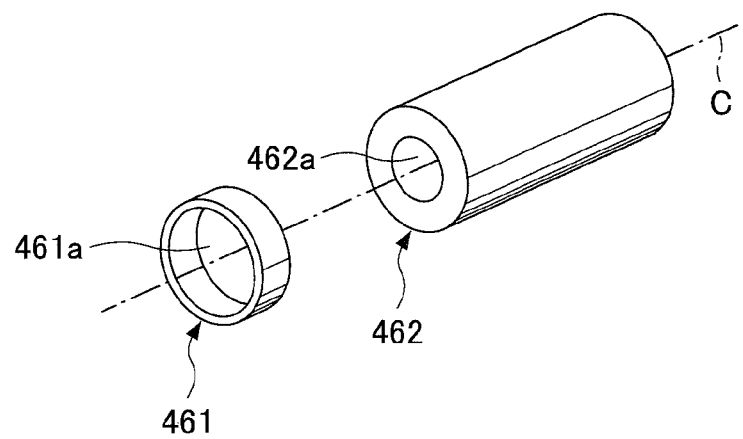
FIG. 1B illustrates an outline of the shapes and positional relationship of an anode and a cathode of the Laser Galvatron® type discharge tube.

In FIGS. 1A and 1B, if the laser beam that enters the discharge tube passes through the through-hole 462a without directly irradiating the cathode 462 itself, the peak of the opto-galvanic signal can be detected with favorable precision. However, in the case where the laser beam is caused to scatter prior to entering the discharge tube or in the case where there is skew in the pointing of the laser beam, the laser beam that enters into the discharge tube 46 can irradiate the cathode. In this case, electrons can be released from the metal material of which the cathode is configured due to a photoelectric effect caused by the cathode being irradiated by the laser beam. There are cases where a voltage component resulting from a photoelectric effect signal produced by the electrons released at this time becomes great. In this case, the signal observed at the aforementioned signal detection point may be a comparatively high photoelectric effect signal overlapping with a comparatively low opto-galvanic signal. As a result, it can be difficult to properly identify the opto-galvanic signal. To rephrase, there are cases where, if the opto-galvanic signal is taken as the desired signal and the photoelectric effect signal is taken as noise, the S/N (signal to noise) ratio drops.

In light of this, according to an embodiment of a wavelength detector provided with the aforementioned discharge tube, an optical system may be configured so that the laser beam can pass through the through-hole of the cathode in the discharge tube without directly irradiating the cathode. An example of the configuration of this optical system will be described in detail later.

Meanwhile, even in the case where the laser beam that enters into the discharge tube passes through the through-hole 462a without directly irradiating the cathode 462 shown in FIGS. 1A and 1B, it is possible for the photoelectric effect signal to be produced when the laser beam passes close to the interior surface of the cathode. In other words, there are cases where the laser beam scatters due to the mixed gas within the airtight receptacle H of the discharge tube, the platinum atoms within the discharge plasma, or the platinum ions. As a result, the photoelectric effect signal can be instigated by a photoelectric effect being produced in the cathode due to part of the scattered laser beam reaching the cathode.

Accordingly, in an embodiment of a wavelength detector provided with the aforementioned discharge tube according to another perspective, even if a signal in which the opto-galvanic signal and the photoelectric effect signal overlap has been observed, a signal processing unit may be provided in order to extract the opto-galvanic signal from the observed signal.

With respect to this other perspective, having observed a signal in which the opto-galvanic signal and the photoelectric effect signal overlap, the inventors discovered the following characteristics with respect to the photoelectric effect signal component and the opto-galvanic signal component found in the observed signal. A voltage component resulting from the photoelectric effect signal has a peak resulting from a sudden signal change within a comparatively short amount of time. On the other hand, a voltage component resulting from the opto-galvanic signal has a peak delayed by a predetermined period following the occurrence of the peak of the photoelectric effect signal.

The inventors consider the following to be the reason for the peak of the opto-galvanic signal being delayed beyond that of the photoelectric effect signal. As described above, the photoelectric effect can occur due to the laser beam scattering when passing through the cathode and part of the scattered laser beam reaching the cathode. The photoelectric effect signal can be produced by this photoelectric effect. Here, it is thought that electrons released from the cathode due to the photoelectric effect have a low mass and therefore move at high velocities. As a result, it is thought that the electrons reach the anode in a short amount of time after being released, which produces a sudden change in voltage. On the other hand, it can be thought that the opto-galvanic signal is produced as a result of the platinum within the discharge plasma being ionized from a vaporous state, as mentioned above. Platinum ions have a larger mass than electrons, and therefore are thought to travel at comparatively low velocities. As a result, it is thought that the amount of time over which the movement of the platinum ions is observed, which corresponds to a change in the voltage of the opto-galvanic signal, is longer than the amount of time over which the photoelectric effect signal is observed.

In light of the aforementioned characteristics of the photoelectric effect signal component and the opto-galvanic signal component, the signal processing unit that can be provided in the wavelength detector may include a low-pass filter for suppressing the detection of the photoelectric effect signal voltage component following a sudden change in voltage. Alternatively, the signal processing unit may delay the signal detection timing by a predetermined amount of time in order to suppress the detection of the photoelectric effect signal peak that occurs earlier timewise.

2. Description of Wavelength Detector

Figure 2:
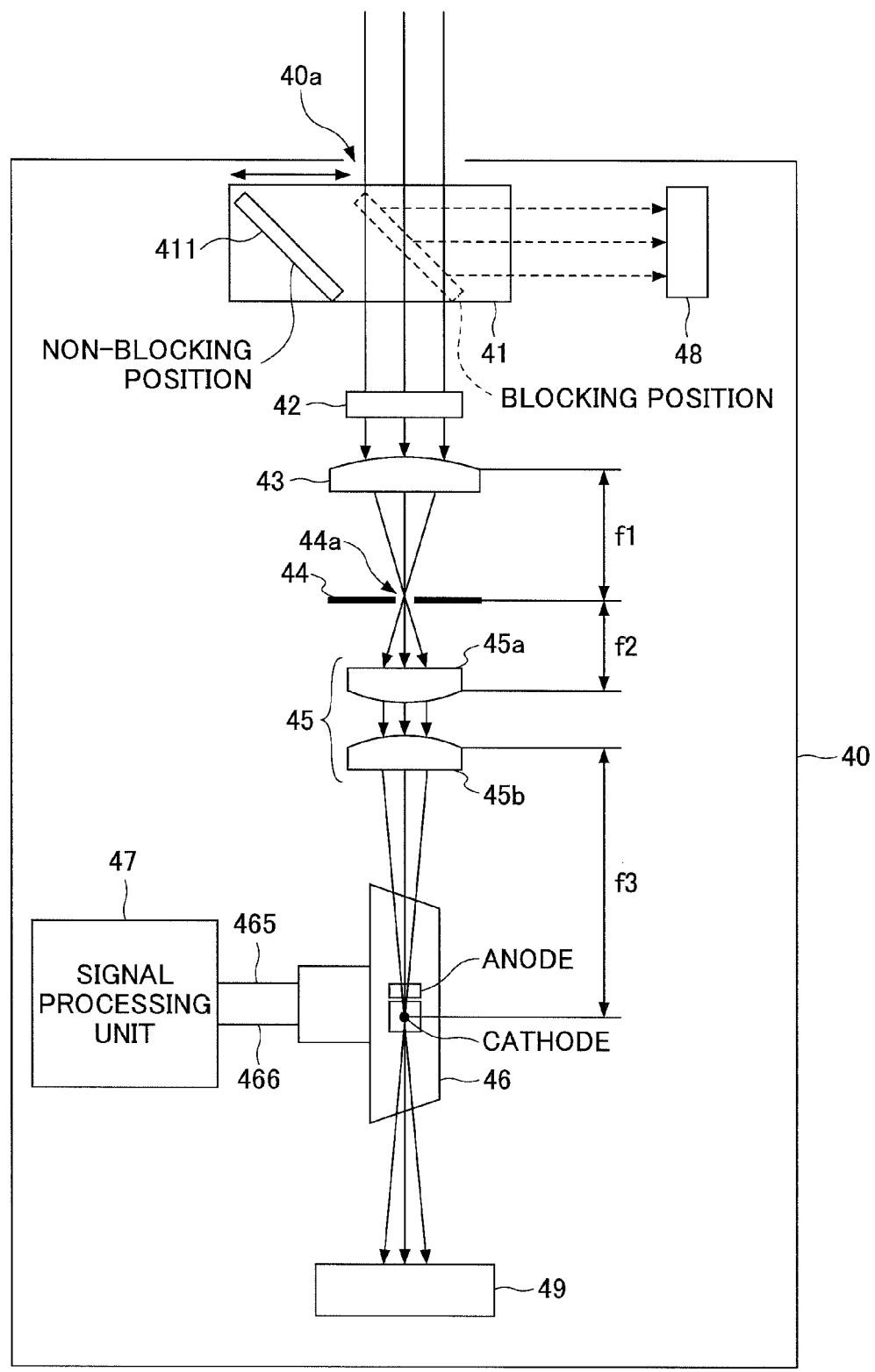
FIG. 2 illustrates the configuration primarily of an optical system in a wavelength detector according to an embodiment.
Figure 3:
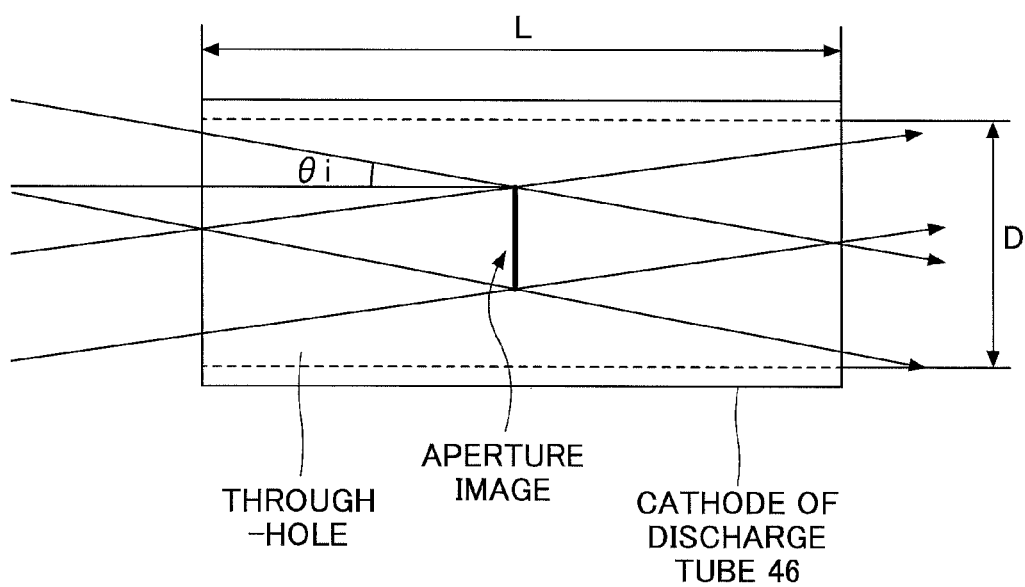
FIG. 3 schematically illustrates an example of a preferred entry state for a laser beam that passes through the cathode of a discharge tube in the wavelength detector according to the embodiment.
Figure 4A:
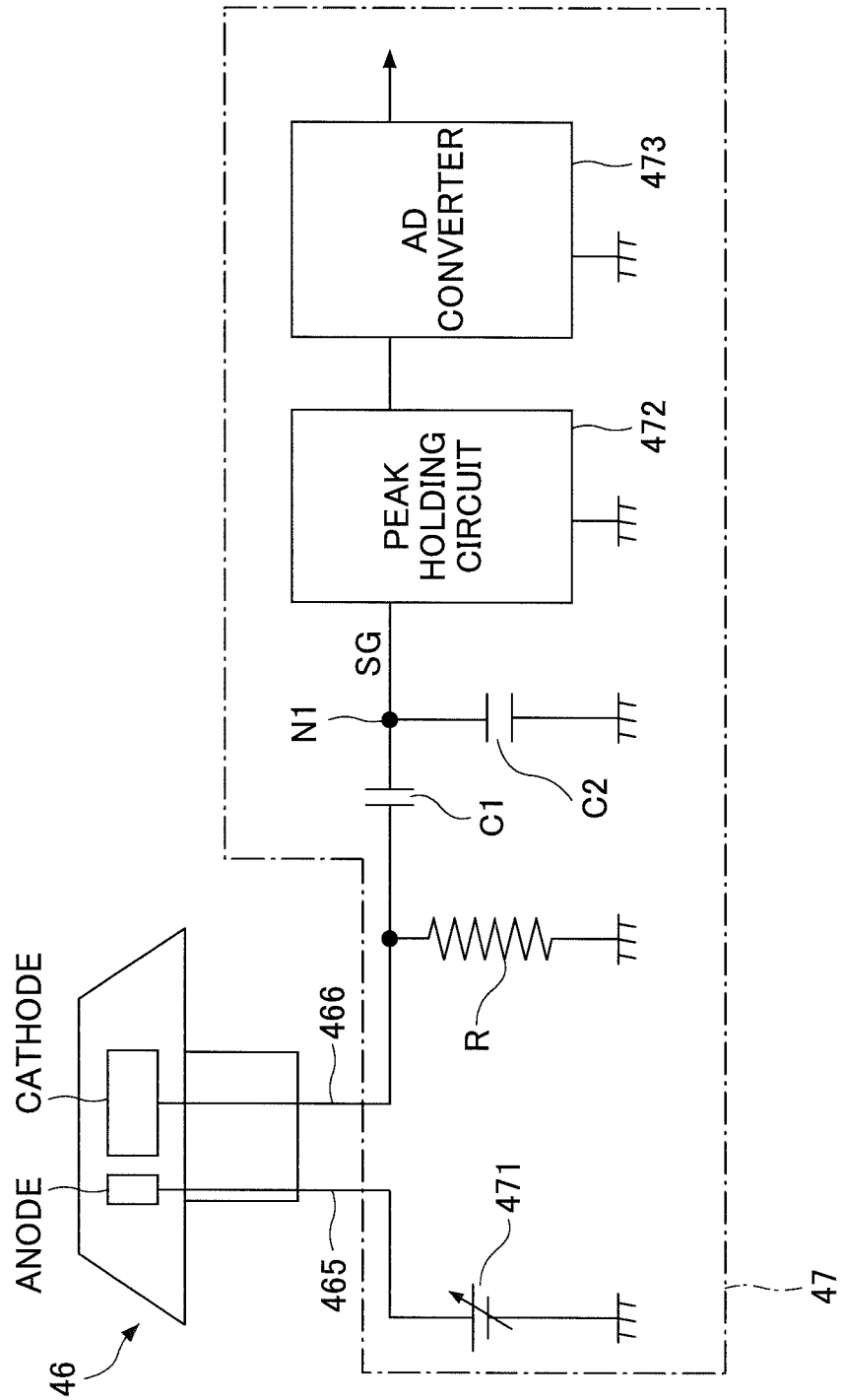
FIG. 4A schematically illustrates an example of a signal processing circuit that can be provided in the wavelength detector according to the embodiment.
Figure 4B:
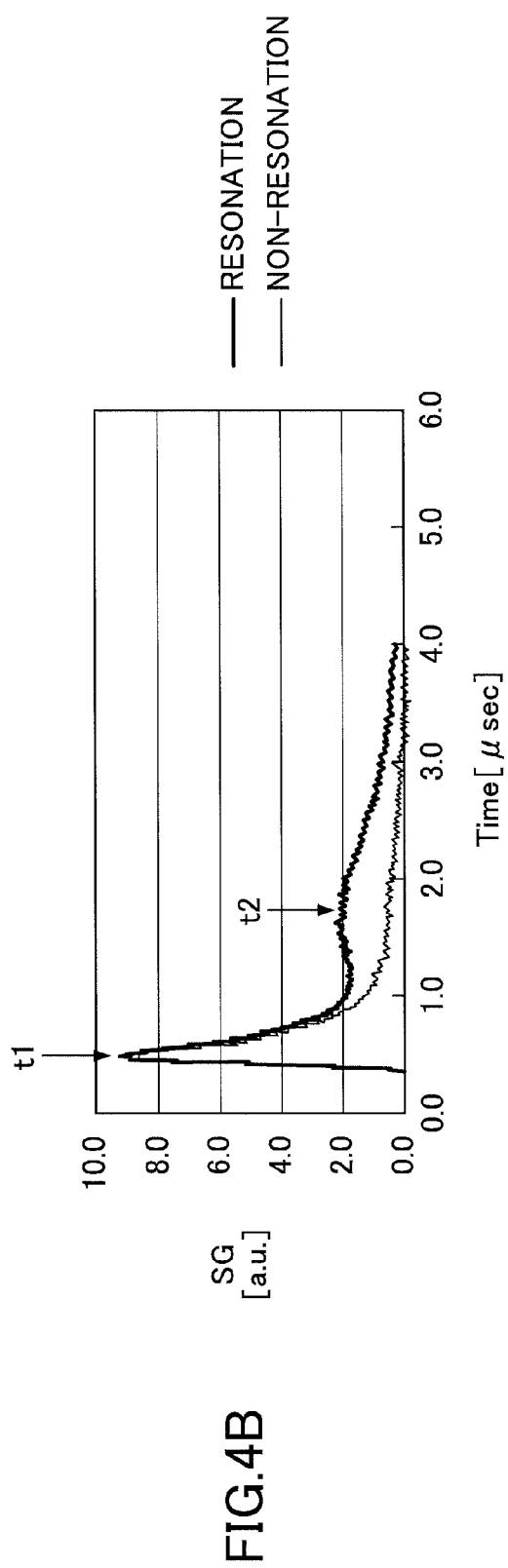
FIG. 4B graphically illustrates change in the voltage of a signal outputted by a signal processing circuit according to the embodiment.
Figure 4C:
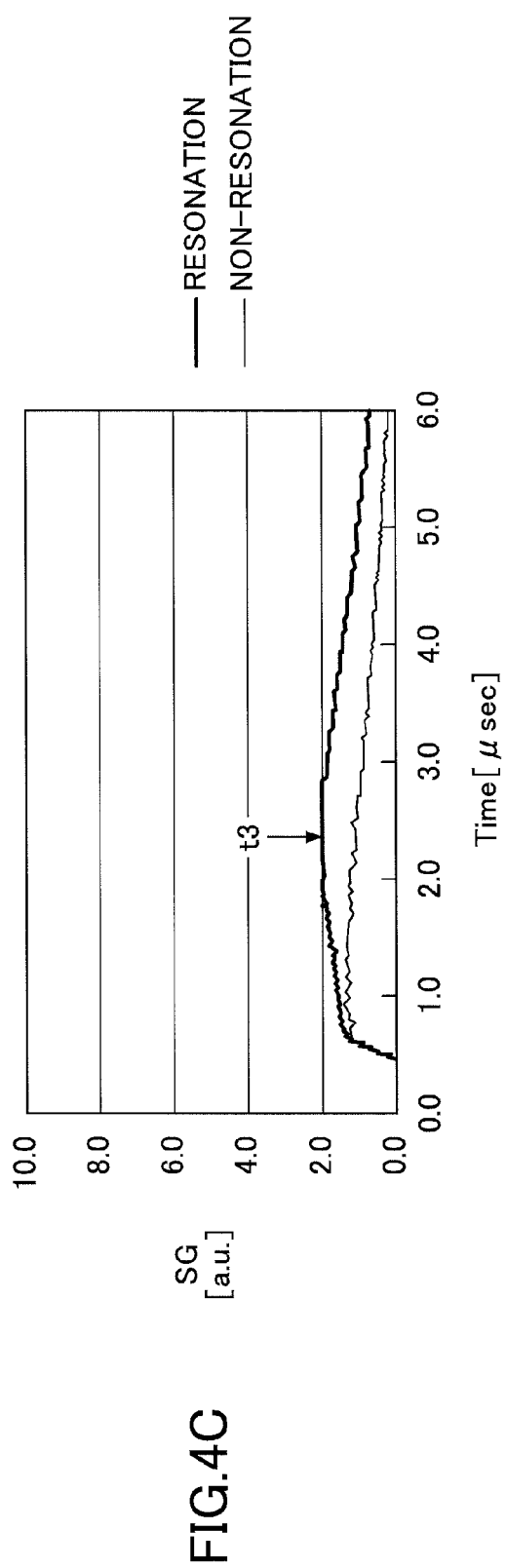
FIG. 4C graphically illustrates change in the voltage of a signal outputted in the case where the signal processing circuit according to the embodiment includes a capacitor.
Figure 5A:
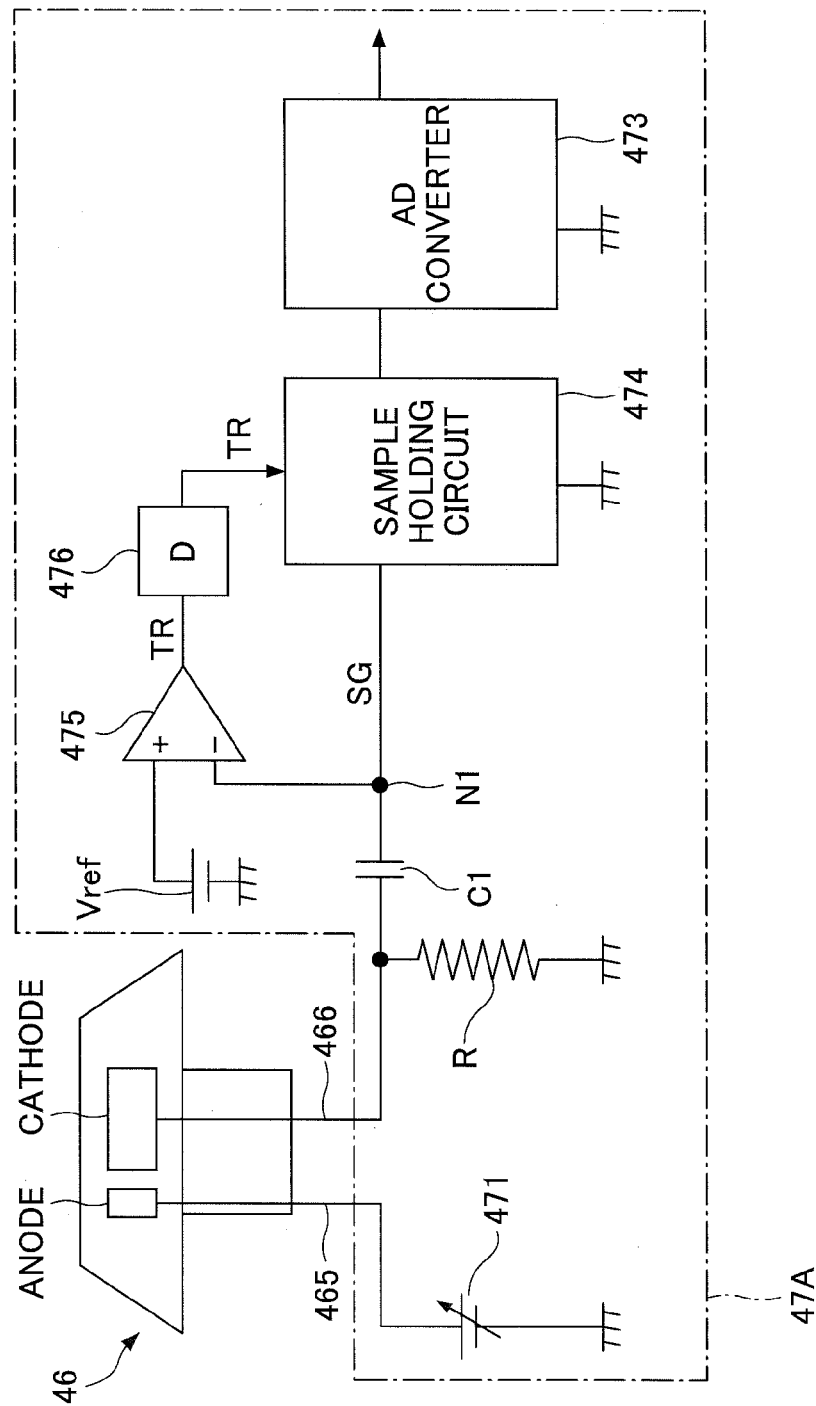
FIG. 5A schematically illustrates another example of a signal processing circuit that can be provided in the wavelength detector according to the embodiment.

Next, a wavelength detector for detecting the absolute wavelength of a laser beam will be described with reference to FIGS. 2 through 5B. FIG. 2 is a diagram illustrating primarily the configuration of an optical system in a wavelength detector 40 according to the present embodiment. FIG. 3 is a diagram illustrating an example of a preferred entry state for a laser beam that passes through the cathode of the discharge tube in the wavelength detector 40 according to the present embodiment. FIGS. 4A, 4B, and 4C are diagrams illustrating an example of a signal processing unit that can be provided in the wavelength detector according to the present embodiment. FIGS. 5A and 5B are diagrams illustrating another example of a signal processing unit that can be provided in the wavelength detector 40 according to the present embodiment.

2.1 Configuration of Optical System

Referring to FIG. 2, the optical system of the wavelength detector 40 according to the present embodiment may include a reflective mirror driving unit 41, a diffusion element 42, a light collection optical system 43, a member 44, a transfer optical system 45, the discharge tube 46, and dumpers 48 and 49. Note that a housing that partially configures the wavelength detector 40 may include an opening 40a for introducing a laser beam.

The reflective mirror driving unit 41 may include a high-reflecting mirror 411, and may position the high-reflecting mirror 411 in a non-blocking position or a blocking position in accordance with a predetermined driving signal. The non-blocking position of the high-reflecting mirror 411 may be a position at which the laser beam entering from the opening 40a can reach the diffusion element 42 located downstream. The blocking position of the high-reflecting mirror 411 may be a position capable of blocking the laser beam so that the laser beam entering from the opening 40a does not reach the diffusion element 42 located downstream.

The dumper 48 may be a laser dumper that absorbs a laser beam. The dumper 48 may be disposed in a position where the dumper 48 absorbs a laser beam reflected by the high-reflecting mirror 411 when the high-reflecting mirror 411 is in the blocking position.

The diffusion element 42 may be an optical element that diffuses and emits a laser beam that has entered thereinto. The diffusion element 42 may, for example, be a diffusion plate, a micro flys-eye lens, or a DOE (diffractive optics element). The diffusion plate may be an optical element obtained by performing a sandblasting process on the surface of a substrate formed of a material that is highly transmissive with respect to a laser beam. The substrate may be, for example, a $CaF_2$ crystal, synthetic silica, or the like. The micro flys-eye lens may be an optical element obtained by forming multiple lenses having diameters of, for example, equal to or less than 1 mm on the surface of a substrate formed of a material that is highly transmissive with respect to a laser beam. The DOE may be an optical element obtained by forming predetermined optical diffraction grooves in the surface of the substrate formed of a material that is highly transmissive with respect to a laser beam.

Note that there are cases where if the diffusion angle of the diffusion element 42 increases, the amount of light that passes through an aperture 44a will drop, which in turn leads to a drop in the detection precision of the opto-galvanic signal in the discharge tube 46. Accordingly, it is preferable for the diffusion element 42 to be a micro flys-eye lens or a DOE, which has a comparatively low diffusion angle.

The light collection optical system 43 may be disposed downstream from the diffusion element 42 in the optical path of the laser beam. The light collection optical system 43 may be an optical element or optical element group that collects the laser beam diffused by the diffusion element 42.

The member 44 may be disposed downstream from the light collection optical system 43 in the optical path of the laser beam. The aperture 44a for allowing the laser beam to pass through may be provided in the member 44. The aperture 44a may be disposed so that a downstream focal position of the light collection optical system 43 is located in the center of the aperture 44a.

The transfer optical system 45 may be disposed downstream from the member 44 in the optical path of the laser beam. The transfer optical system 45 may be provided in order to transfer an image in the aperture 44a downstream in the optical path of the laser beam. As shown in FIG. 2, the transfer optical system 45 may, for example, include two lenses, or a lens 45a on the aperture 44a side, and a lens 45b on the discharge tube 46 side. At this time, the lens 45a may be disposed so that the upstream focal position of the lens 45a is positioned in the center of the aperture 44a, or in other words, so that the upstream focal distance of the lens 45a corresponds to f2 shown in FIG. 2. Meanwhile, the lens 45b may be disposed so that the downstream focal position of the lens 45b is located within the through-hole of the cathode in the discharge tube 46, or in other words, so that the downstream focal distance of the lens 45b corresponds to f3 in FIG. 2.

The discharge tube 46 may be a Laser Galvatron® type discharge tube similar to the discharge tube shown in FIGS. 1A and 1B, and may be disposed downstream from the transfer optical system 45 in the optical path of the laser beam. The discharge tube 46 may be disposed so that the laser beam that passes through the aperture 44a passes through the through-hole of the cathode in the discharge tube 46 without directly irradiating the cathode, so as to suppress the occurrence of the photoelectric effect signal that is caused by the cathode of the discharge tube 46 being directly irradiated by part of the laser beam.

The dumper 49 may be a laser dumper that absorbs a laser beam, and may be disposed downstream from the discharge tube 46 in the optical path of the laser beam. By providing the dumper 49 downstream from the discharge tube 46, a loss of highly-precise detection in the discharge tube 46, caused by an unneeded laser beam that has passed through the discharge tube 46 once again entering into the discharge tube 46 or into the optical path that spans to the discharge tube 46, may be prevented. The dumpers 48 and 49 preferably have a structure in which multiple light-absorbing members are disposed opposing each other with their absorption surfaces facing inward, and the configuration may be such that the absorption effects for scattered light are increased by reflecting in multiple the laser beam in the inner space enclosed by the multiple absorbing members. The energy of the absorbed laser beam may be converted into thermal energy. In order to discharge this thermal energy, the dumpers 48 and 49 may be provided in combination with an appropriate cooling apparatus such as a water cooling jacket or the like.

With the optical system of the wavelength detector 40 according to the present embodiment, the elements of which the optical system is configured may be disposed as desired as long as the laser beam can pass through the through-hole of the cathode of the discharge tube 46 without directly irradiating the cathode. An example of the disposal of the elements of which the optical system is configured will be described with reference to FIGS. 2 and 3.

In FIG. 2, the optical system in the wavelength detector 40 may be configured so that an image in the aperture 44a passes through the transfer optical system 45 and is formed within the through-hole of the cathode of the discharge tube 46. Hereinafter, an image in the aperture 44a will be referred to as an "aperture image". For example, as shown in FIG. 3, the aperture image may be formed in the center of the cylindrical cathode of the discharge tube 46.

Here, it is assumed that the numerical aperture of the aperture 44a side lens 45a in the transfer optical system 45 is NAo, the numerical aperture of the image formation side (discharge tube 46 side) lens 45b is NAi, the diameter of the aperture 44a is $\phi$, the width of the cathode in the discharge tube 46 is L, and the inner diameter (diameter of the through-hole) of the cathode is D. $\theta i$ in FIG. 3 expresses the entry angle of laser beams relative to the center axis of the cylindrical cathode. At this time, in the case where the stated parameters fulfill the following Equation 1, the laser beam that enters into the through-hole of the cathode of the discharge tube 46 can be prevented from directly irradiating the cathode.

$$D > \phi \cdot (NAo/NAi) + L \cdot \tan(\theta i) \qquad \text{Equation 1}$$

Note that $\theta i = \sin^{-1}(NAi)$.

2.2 Operations of Optical System

Next, operations of the optical system in the wavelength detector 40 will be described with reference to FIG. 2.

In the wavelength detector 40, the reflective mirror driving unit 41 may drive the high-reflecting mirror 411 so that the high-reflecting mirror 411 is disposed in the non-blocking position in the case where the wavelength of an entering laser beam is to be detected, such as in the case where the wavelength calibration system is to be operated. In this case, the laser beam that has entered from the opening 40a may reach the diffusion element 42. The reflective mirror driving unit 41 may drive the high-reflecting mirror 411 so that the high-reflecting mirror 411 is disposed in the blocking position in the case where the wavelength of an entering laser beam is not to be detected, such as in the case where the wavelength calibration system is not to be operated. In this case, the laser beam that has entered from the opening 40a may be reflected by the high-reflecting mirror 411 and absorbed by the dumper 48.

The diffusion element 42 may diffuse the laser beam that has entered. At least part of the diffused laser beam may be collected by the light collection optical system 43 on a focal plane thereof (that is, the position of the downstream focal distance f1 of the light collection optical system 43). The image in the aperture 44a that can be disposed upon the focal plane of the light collection optical system 43 may be transferred by the transfer optical system 45. At this time, the optical system of the discharge tube 46 or the like, for example, may be disposed so that the laser beam emitted from the transfer optical system 45 passes through the through-hole of the cathode of the discharge tube 46 without directly irradiating the cathode. For example, the aperture image may be formed within the through-hole of the cathode of the discharge tube 46, as in the example shown in FIG. 3. In this manner, with the wavelength detector 40 according to the present embodiment, the optical system is configured so that the laser beam passes through the through-hole of the cathode 462 without directly irradiating the cathode 462, and thus the peak of the opto-galvanic signal can be detected with precision.

The following three purposes can be given as purposes for providing the diffusion element 42 in the optical system of the wavelength detector 40 according to the present embodiment.

A first purpose may be to make the laser beam wavelength distribution uniform before the laser beam outputted from the ultra violet laser device enters into the discharge tube 46.

There are cases where the laser beam that enters into the wavelength detector 40 has a wavelength that differs depending on the position within the plane orthogonal to the direction in which the laser beam advances. In other words, there are cases where different wavelength components are present in the width direction of the laser beam. For example, in a laser beam whose spectral line width has been adjusted by a line narrow module that includes a grating, the wavelength differs between a diffracted beam of light having a low diffraction angle and a diffracted beam of light having a high diffraction angle in the grating, and furthermore, there are cases where the diffraction angles depend on the position in the width direction of the laser beam. Accordingly, in the case where the cross-section of the entering laser beam is, for example, rectangular, the component of the laser beam on one end of the rectangular cross-section has a shorter wavelength, whereas the component of the laser beam on the other end has a longer wavelength. Here, assuming that the diffusion element 42 is not provided, it is possible for only a specific wavelength component corresponding to a position along the width direction of the laser beam to pass through the through-hole of the cathode of the discharge tube 46, and for the wavelength to be detected based only on that wavelength component. It is highly likely that a wavelength detected in this manner does not reflect the majority of the wavelengths in the laser beam outputted from the ultra violet laser device.

Accordingly, in the present embodiment, a distribution or localization of the wavelength components based on the position in the width direction of the laser beam may be alleviated by diffusing the laser beam using the diffusion element 42 before the laser beam passes through the discharge tube 46. Through this, the laser beam that passes through the through-hole of the cathode of the discharge tube 46 can contain the various wavelength components outputted from the ultra violet laser device. As a result, the likelihood that the majority of the wavelength components in the laser beam outputted from the ultra violet laser device are detected by the wavelength detector 40 may be increased.

Note that it is preferable, from the following standpoint, to detect the majority of the wavelength components in the laser beam outputted from the ultra violet laser device.

In an exposure device, a process that equally integrates various wavelength components in a laser beam outputted from the ultra violet laser device may be carried out. Specifically, the exposure device may be designed so that laser beam containing various wavelength components based on positions in the width direction is projected uniformly upon a mask via, for example, a fly's eye lens and a condenser lens. This type of optical design is sometimes referred to as Kohler illumination. In this configuration, the wavelength of the laser beam projected upon the mask can overlap with the various wavelength components of the laser beam outputted from the ultra violet laser device. In the exposure device, a wavelength target value may be set for the ultra violet laser device based on a representative value of a wavelength distribution that includes the various wavelength components projected upon the mask.

It is preferable for the process carried out in the exposure device for equally integrating or superimposing the various wavelength components of the laser beam outputted from the ultra violet laser device to be carried out in essentially the same manner in the wavelength detector 40 as well. If the processes for the various wavelength components of the laser beam are essentially the same in the exposure device and the wavelength detector 40, the wavelength of the laser beam can be tracked with high precision relative to the wavelength target value set by the exposure device, based on the wavelength detection value detected by the wavelength detector 40.

A second purpose for providing the diffusion element 42 may be to increase the certainty that at least part of the laser beam will pass through the aperture even in the case where the pointing of the laser beam that has entered from the ultra violet laser device has shifted.

In FIG. 2, the light collection optical system may be designed so that the laser beam that has entered in the direction orthogonal to the diffusion element 42 passes through the aperture 44a. However, it is not necessarily the case that the direction in which the laser beam is outputted from the ultra violet laser device is always oriented in a single desired direction. Cases can arise in which the laser beam is outputted in a direction that forms a certain angle relative to the target output direction. In other words, there are cases where the pointing of the laser beam shifts. In this case, there can be cases where the laser beam that enters from the opening 40a of the wavelength detector 40 does not necessarily follow the direction orthogonal to the diffusion element 42 shown in FIG. 2, and instead enters in a direction slightly shifted from that direction. Even in such a case, part of the laser beam that enters in the direction that is slightly shifted from the direction orthogonal to the diffusion element 42 can, due to the light diffusion effect of the diffusion element 42, exit in a direction orthogonal to the surface into which the beam entered and pass through the aperture 44a via the light collection optical system 43. In other words, the optical system of the wavelength detector 40 can ensure a certain amount of laser beam passing through the aperture 44a due to the light diffusion effect of the diffusion element 42, and can detect the wavelength of the laser beam, even in the case where the pointing of the laser beam from the ultra violet laser device has shifted. To rephrase, providing the diffusion element 42 makes it possible to increase the permissible level of shifting in the pointing of the entering laser beam when detecting the wavelength.

A third purpose may be making it easy to adjust the optical axis relative to the laser beam.

In an initial state when the wavelength detector 40 has commenced operations, adjustment may be carried out on the optical axis for forming, within the through-hole of the cathode of the discharge tube 46, the aperture image resulting from the entering laser beam. In other words, the positions and angles of the light collection optical system 43, the member 44 including the aperture 44a, the transfer optical system 45, and the discharge tube 46 may be adjusted relative to the laser beam optical axis, and may be fixed within the housing of the wavelength detector 40. At this time, the aperture image can be formed within the through-hole of the cathode of the discharge tube 46 without performing highly-precise adjustment with the diffusion element 42. As described thus far, disposing the diffusion element 42 makes it possible to ensure a certain amount of laser beam passing through the aperture 44a, even in the case where the pointing of the laser beam from the ultra violet laser device has shifted. This may correspond to a high level of allowance for skew in the entry angle, entry position, and so on of the laser beam in the initial state. Therefore, with the optical system of the wavelength detector 40 according to the present embodiment, it is possible that the amount of time for optical axis adjustment operations can be reduced.

2.3 First Example of Signal Processing Unit

Next, a first example of a signal processing unit 47 that can be provided in the wavelength detector 40 illustrated in FIG. 2 will be described with reference to FIGS. 4A, 4B, and 4C.

As described earlier, in the case where a Laser Galvatron® type discharge tube is used, a signal in which an opto-galvanic signal and a photoelectric effect signal overlap can be observed at a signal detection point provided toward the cathode of the discharge tube. At this time, as described earlier, the component of the observed signal that corresponds to the photoelectric effect signal can have a peak produced by a sudden signal change within a comparatively short amount of time, whereas the component that corresponds to the opto-galvanic signal can have a peak produced after a set period has elapsed following the occurrence of the peak of the photoelectric effect signal. Accordingly, a first example of the signal processing unit 47 in the wavelength detector 40 may include a low-pass filter that removes the photoelectric effect signal accompanied by the sudden level change.

2.3.1 Configuration

As shown in FIG. 4A, the signal processing unit 47 may include a high-voltage DC power source 471, a peak holding circuit 472, an AD (analog to digital) converter 473, a resistance R, and capacitors C1 and C2.

The high-voltage DC power source 471 may be provided between the anode of the discharge tube 46 and a GDN (ground). The resistance R for restricting a current may be provided between the cathode and the GND. The capacitor C1 may be provided between the cathode and a signal detection point N1. The capacitor C2 may be provided between the signal detection point N1 and the GND. The signal detection point N1 may be a signal detection point provided for observing a change in a voltage signal caused by the opto-galvanic effect. The capacitor C2 may configure a low-pass filter with the resistance R.

The peak holding circuit 472 may be a circuit that holds the peak value of a voltage in a signal SG observed at the signal detection point N1. The AD converter may be a circuit that converts the peak value of the voltage held by the peak holding circuit 472 into digital data.

2.3.2 Operations

With the signal processing unit 47 shown in FIG. 4A, a high voltage may be applied to the anode of the discharge tube 46 by the high-voltage DC power source 471. At this time, a change in the voltage arising in the cathode may be observed at the signal detection point N1 through the capacitor C1. When a laser beam is not being irradiated in the discharge tube 46, a stable plasma discharge is produced between the anode and the cathode, and because it can be thought that the impedance between the anode and the cathode is essentially constant, it may be thought that almost no change occurs in the voltage of the cathode. Here, the impedance between the anode and the cathode may change when the discharge plasma resonates due to the laser beam, the cathode is further directly irradiated with the laser beam, and so on. As a result, the voltage of the signal SG observed at the signal detection point N1 may also change. At this time, the signal SG observed at the signal detection point N1 may include the opto-galvanic signal component caused by the discharge plasma resonating due to the laser beam, and the photoelectric effect signal component caused by the cathode being directly irradiated with the laser beam. Here, the photoelectric effect signal may be a signal that includes many high-frequency components resulting from the sudden signal change. With the signal processing unit 47 illustrated in FIG. 4A, the low-pass filter that includes the capacitor C2 may remove the high-frequency components of the photoelectric effect signal. As a result, the opto-galvanic signal component can be identified with ease in the signal SG observed at the signal detection point N1.

The voltage of the signal SG from which the photoelectric effect signal component has been removed may be consecutively taken into the peak holding circuit 472. The peak holding circuit 472 may hold the maximum voltage of the signal SG at a given point in time. The voltage held by the peak holding circuit 472 may be a peak voltage including the opto-galvanic signal component. The AD converter 473 may convert the peak voltage including the opto-galvanic signal component that can be held by the peak holding circuit 472 into digital data. After this, the peak holding circuit 472 may be reset.

The digital data obtained by the AD converter 473 may, for example, be sent to a signal processing circuit external to the wavelength detector 40, and may be used for calibrating the wavelength indicated by the wavelength detection value in the ultra violet laser device.

FIG. 4B illustrates an example of a voltage change in the signal SG that can be observed at the signal detection point N1, in the case where the capacitor C2 is not provided in the configuration illustrated in FIG. 4A. FIG. 4B illustrates examples of a voltage change in the signal SG that can be observed at the signal detection point N1 in the case where resonation is produced in the discharge plasma within the discharge tube 46 by the laser beam entering into the discharge tube 46 and in the case where such resonation is not produced. Note that the time 0 on the horizontal axis in FIG. 4B expresses a reference time for measurement, obtained through experimentation. In addition, in FIG. 4B, the voltage change in the case where resonation is not being produced is indicated as "non-resonation".

As shown in FIG. 4B, a peak may be produced by the photoelectric effect signal due to a sudden signal change at a time t1 regardless of whether or not resonation is produced in the discharge plasma by the laser beam. In addition, when resonation is produced in the discharge plasma by the laser beam, a peak may be produced by the opto-galvanic signal at a time t2 that follows the time t1 (in the example shown in FIG. 4B, approximately 1.3 µs thereafter).

Meanwhile, FIG. 4C illustrates an example of a voltage change in the signal SG that can be observed at the signal detection point N1 in the case of a configuration that includes the capacitor C2 shown in FIG. 4A. As shown in FIG. 4C, much of the high-frequency component of the photoelectric effect signal has been removed by the signal processing unit 47 from the signal that can be observed at the signal detection point N1. As a result, it is easier to identify the opto-galvanic signal that contains comparatively more low-frequency components. In the example shown in FIG. 4C, a peak produced by the opto-galvanic signal can be observed at a time t3 in the case where resonation has been produced between the laser beam and the discharge plasma within the discharge tube 46.

Note that by appropriately selecting the value of the capacitor C2 in FIG. 4A, a cutoff frequency may be set in the low-pass filter so that the main frequency component of the opto-galvanic signal is not removed and the main frequency component of the photoelectric effect signal is removed.

R=10 kΩ, C1=0.04 µF, and C2=1.0-1.5 nF may be given as examples of the values set for the circuits in the signal processing unit 47 shown in FIG. 4A. Meanwhile, the voltage applied by the high-voltage DC power source 471 may be adjusted within a range of 200 to 500 V so that the current flowing in the discharge tube is at 20 mA.

2.4 Second Example of Signal Processing Unit

A signal processing unit 47A, serving as a second example of the signal processing unit 47 in the wavelength detector 40, may include a delay circuit that delays the signal detection timing at the signal detection point N1 by a predetermined amount of time in order to suppress the detection of the photoelectric effect signal arising in a short amount of time.

2.4.1 Configuration

As shown in FIG. 5A, the signal processing unit 47A may include the high-voltage DC power source 471, the AD converter 473, a sample holding circuit 474, a comparator 475, a delay element 476, the resistance R, and the capacitor C1. The comparator 475 and the delay element 476 may be examples of delay circuits.

The high-voltage DC power source 471 may be provided between the anode of the discharge tube 46 and the GDN (ground). The resistance R for restricting a current may be provided between the cathode and the GND. The capacitor C1 may be provided between the cathode and the signal detection point N1. The signal detection point N1 may be a signal detection point provided for observing a change in the level of a signal caused by the opto-galvanic effect.

The comparator 475 may compare the voltage of the signal SG at the signal detection point N1 with a predetermined reference voltage Vref, and may output a logic signal TR based on the result of the comparison. For example, an inverting input terminal of the comparator 475 may be connected to the signal detection point N1, and a non-inverting input terminal of the comparator 475 may be connected to the positive-polarity side of the reference voltage Vref. The voltage value of the reference voltage Vref may be a suitable threshold for detecting the timing of a rise in the photoelectric effect signal.

The delay element 476 may delay the logic signal TR inputted from the comparator 475 by a predetermined amount of time (a delay time) and output the delayed signal. An example of the delay time in the delay element 476 may be a time spanning from when the voltage of the signal SG containing the photoelectric effect signal exceeds the voltage value of the reference voltage Vref to when the peak value occurs in the opto-galvanic signal. Alternatively, the delay time may be a time spanning from when the voltage of the signal SG exceeds the voltage value of the reference voltage Vref to when the voltage of the signal SG drops below the reference voltage Vref. It is preferable for this delay time to be determined by measuring, through experimentation, a signal SG in which resonance is produced, in advance.

The sample holding circuit 474 may consecutively sample the values of the voltage in the signal SG observed at the signal detection point N1. The sample holding circuit 474 may be activated and commence sampling operations in the case where the logic signal TR outputted from the delay element 476 is a predetermined logic level. The AD converter 473 may consecutively convert the voltages sampled by the sample holding circuit 474 into digital data.

2.4.2 Operations

Like the signal processing unit 47, the signal SG in the signal processing unit 47A shown in FIG. 5A may include the opto-galvanic signal component and the photoelectric effect signal component.

When the signal SG observed at the signal detection point N1 exceeds the reference voltage Vref, the level of the logic signal TR outputted from the comparator 475 may change from, for example, H (high) level to L (low) level. The delay element 476 may delay the L level logic signal TR by the predetermined amount of time and output the delayed signal. The sample holding circuit 474 may begin sampling the signal SG at the signal detection point N1 in response to the logic signal TR changing to L level. Here, the timing at which the sample holding circuit 474 commences sampling may be delayed by the delay element 476 for the delay time following the timing at which the signal SG observed at the signal detection point N1 has exceeded the voltage value of the reference voltage Vref. Through this configuration, the sample holding circuit 474 can avoid sampling the peak produced by the photoelectric effect signal.

Note that the peak produced by the opto-galvanic signal may occur after the peak produced by the photoelectric effect signal. Accordingly, the delay time set in the delay element 476 may be a suitable time through which the sample holding circuit 474 can sample the peak produced by the opto-galvanic signal without sampling the peak produced by the photoelectric effect signal.

The voltage value of the signal SG that does not include a peak produced by the photoelectric effect signal may be consecutively sampled by the sample holding circuit 474. The AD converter 473 may consecutively convert the voltages sampled by the sample holding circuit 474 into digital data. In this manner, digital data whose primary component is the opto-galvanic signal can be obtained from the signal observed at the signal detection point N1.

The digital data obtained by the AD converter 473 may, for example, be sent to a signal processing circuit external to the wavelength detector 40, and may be used for calibrating the wavelength of the wavelength detection value in the ultra violet laser device.

Note that the configurations of the signal processing unit 47 and the signal processing unit 47A in the wavelength detector are not limited to the configurations shown in FIGS. 4A and 5A. It is also possible to directly take the signal SG at the signal detection point N1 into a high-resolution AD converter without using a low-pass filter, a delay element, or the like, and extract the opto-galvanic signal component by performing signal processing on the resulting digital signal. In other words, the signal processing unit 47 may include a digital signal processing circuit that carries out a filtering process for removing the photoelectric effect signal and/or a delay process that delays the signal detection timing at the signal detection point N1 by the predetermined amount of time, rather than having an analog element that configures a low-pass filter or a delay element.

3. Description of Wavelength Calibration System

Next, a wavelength calibration system using the aforementioned wavelength detector 40 will be described with reference to FIGS. 6 through 11.

Figure 6:
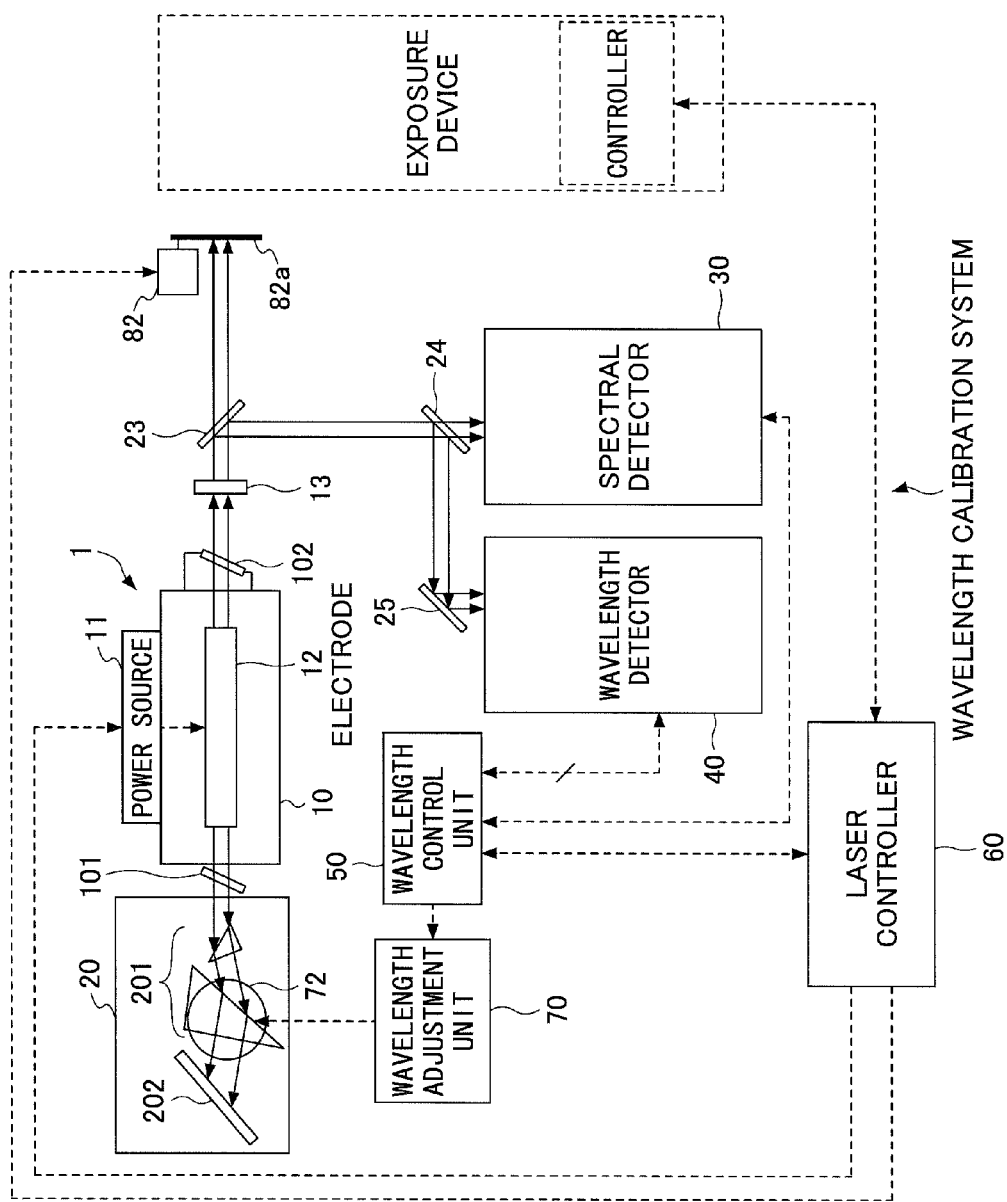
FIG. 6 schematically illustrates an example of the system configuration of a wavelength calibration system according to an embodiment.
Figure 7:
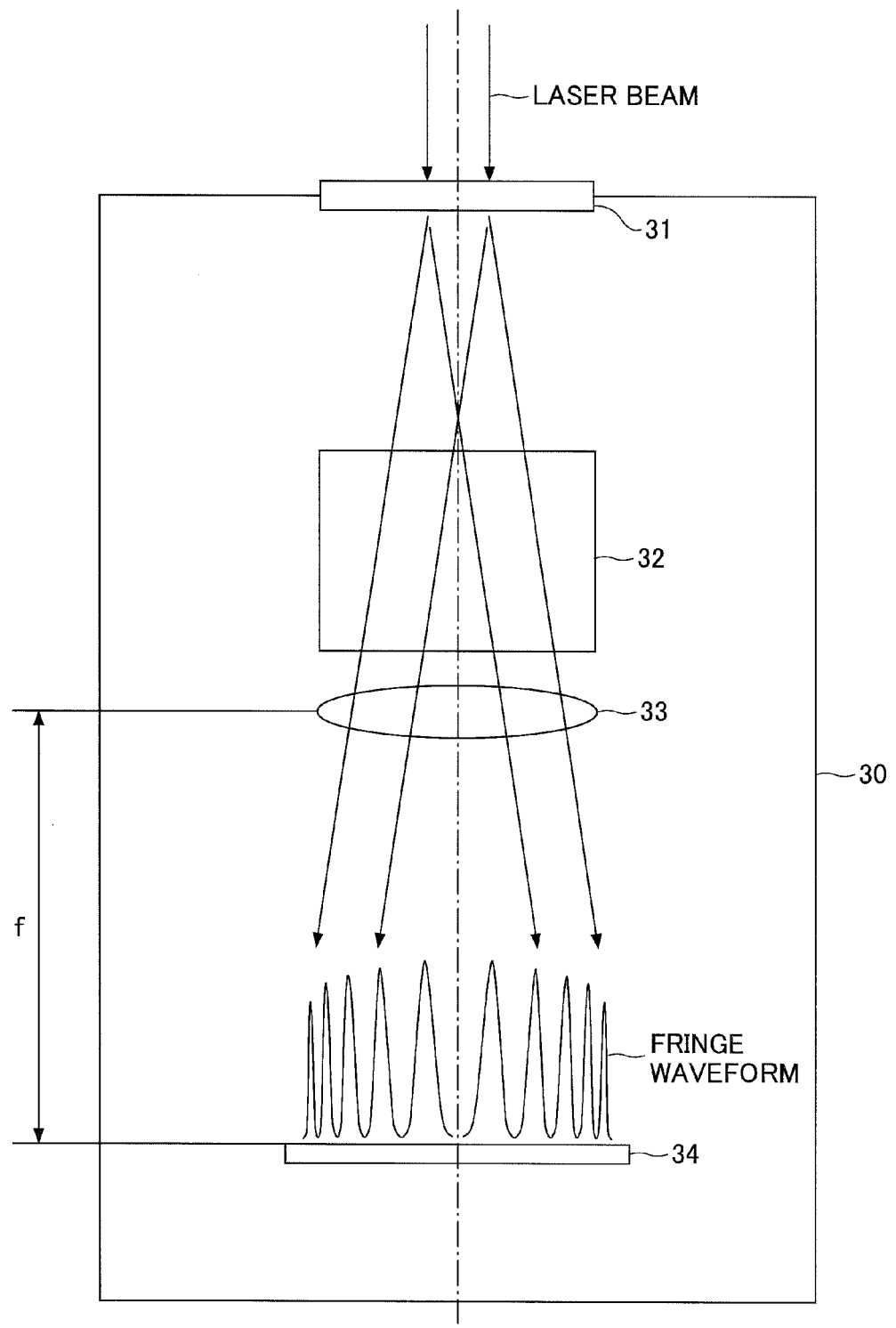
FIG. 7 schematically illustrates an etalon spectroscope serving as an example of the configuration of a spectral detector.
Figure 8:
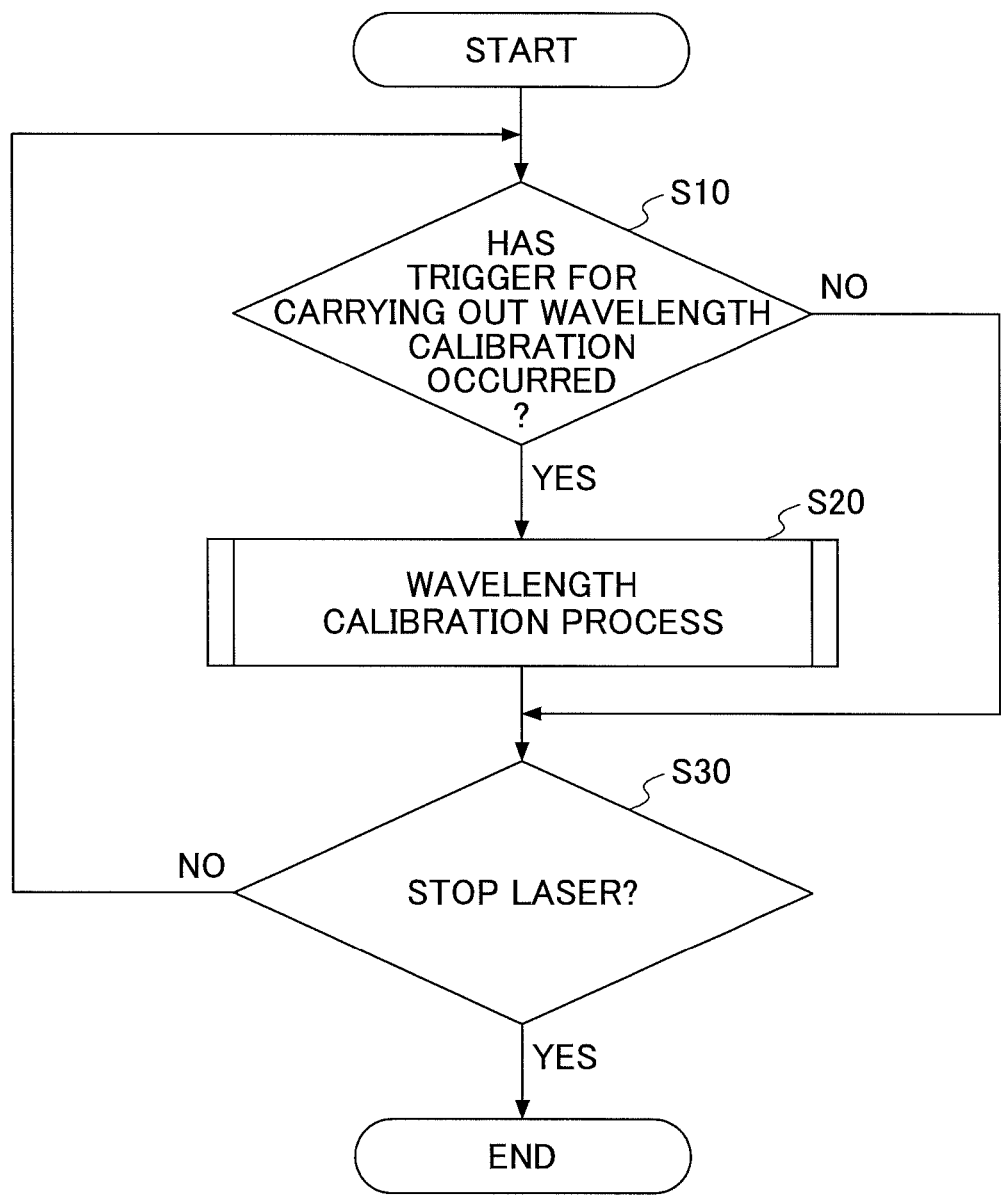
FIG. 8 is a flowchart illustrating an example of a main routine in operations performed by the wavelength calibration system according to the embodiment.
Figure 9:
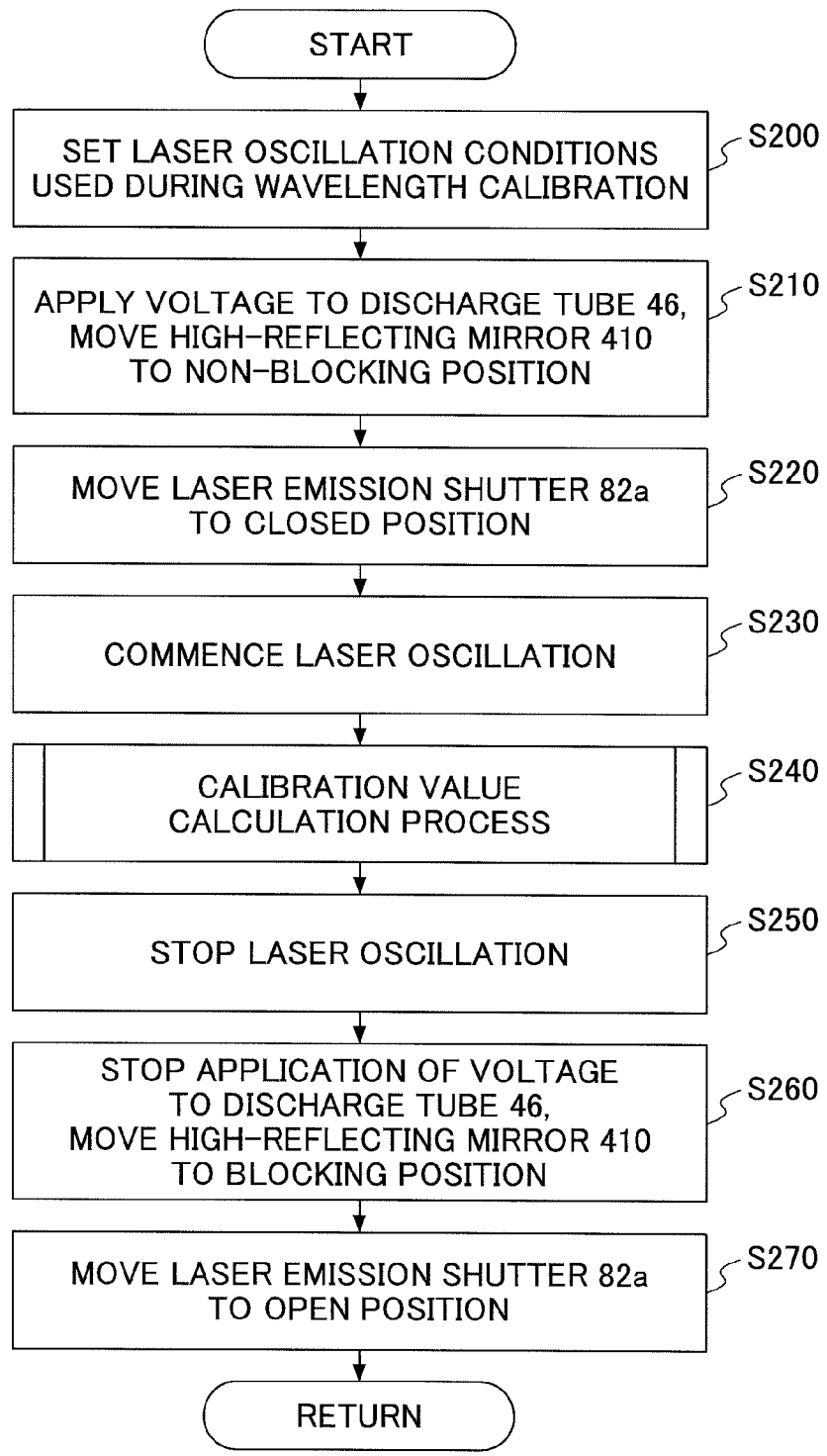
FIG. 9 is a flowchart illustrating an example of a subroutine of a wavelength calibration process.
Figure 10:
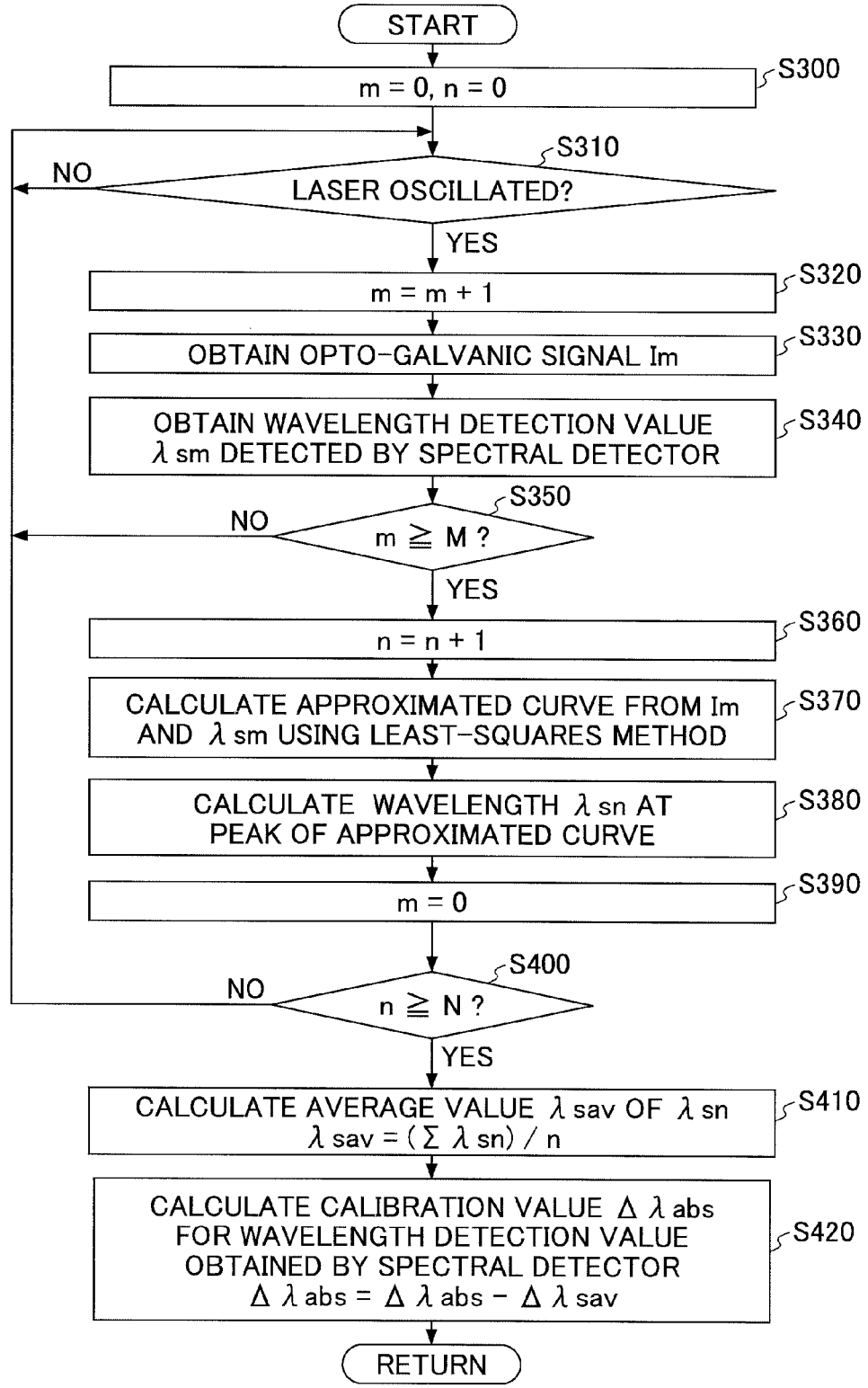
FIG. 10 is a flowchart illustrating an example of a subroutine of a calibration value calculation process.
Figure 11:
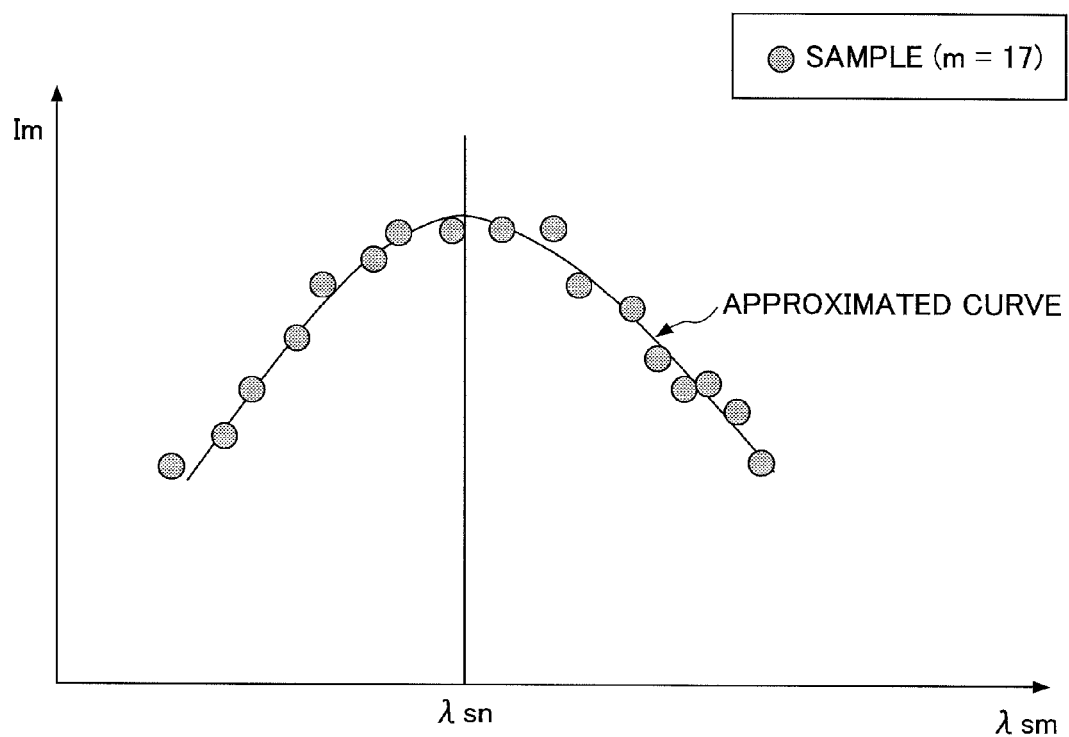
FIG. 11 schematically illustrates a sampling process in the calibration value calculation process.

FIG. 6 is a diagram illustrating an example of the configuration of the wavelength calibration system according to the present embodiment. In FIG. 6, the solid line arrows indicate the advancement path of the laser beam in a schematic and exemplary manner, whereas the dotted line arrows indicate examples of the sending/receiving of electric signals. FIG. 7 is a diagram illustrating an example of an etalon spectroscope that employs an etalon, serving as an example of the configuration of a spectral detector. FIG. 8 is a flowchart illustrating an example of a main routine in operations performed by the wavelength calibration system according to the present embodiment. FIG. 9 is a flowchart illustrating an example of a subroutine of a wavelength calibration process. FIG. 10 is a flowchart illustrating an example of a subroutine of a calibration value calculation process. FIG. 11 is a diagram illustrating a sampling process in the calibration value calculation process.

3.1 System Configuration

The configuration of the wavelength calibration system according to the present embodiment will be described herein after with reference to FIG. 6.

As shown in FIG. 6, the wavelength calibration system according to the present embodiment may include a laser chamber 10, an output coupling mirror 13, a line narrow module 20, beam splitters 23 and 24, a high-reflecting mirror 25, a spectral detector 30, the wavelength detector 40, a wavelength control unit 50, a laser controller 60, a wavelength adjustment unit 70, and a shutter driving unit 82. Note that in the system configuration illustrated in FIG. 6, an ultra violet laser device 1 according to the present embodiment may include at least the laser chamber 10, the output coupling mirror 13, and the line narrow module 20.

In the wavelength calibration system shown in FIG. 6, the wavelength detector 40 may be an example of a first wavelength detector, and the spectral detector 30 may be an example of a second wavelength detector.

A laser medium may be injected into the laser chamber 10. In the case where the ultra violet laser device 1 according to the present embodiment is an ArF excimer laser device, the laser medium may be a mixed gas containing, for example, Kr gas, F2 gas, and Ne gas. In the case where the ultra violet laser device 1 according to the present embodiment is a KrF excimer laser device, the laser medium may be a mixed gas containing, for example, Kr gas, F2 gas, and Ne gas. The ultra violet laser device 1 according to the present embodiment is not limited to an excimer laser device, and may be another laser device, such as a solid-state laser device (for example, a solid-state laser device that combines titanium sapphire with a nonlinear optical crystal).

Hereinafter, a case in which the ultra violet laser device 1 is an ArF excimer laser device whose laser beam has a wavelength of 193 nm will be described as an example.

At least a pair of electrodes 12, not shown, may be provided within the laser chamber 10. Based on a signal from the laser controller 60, a power source 11 supplies a pulse voltage between the electrodes, causing a discharge to occur and putting the mixed gas, which is the laser medium, into a pumped state. Windows 101 and 102 may be provided in the laser chamber 10 in order to allow the laser beam to pass while sealing the mixed gas inside the laser chamber 10. Each of the windows 101 and 102 may be a Brewster window for linearly polarizing the laser beam outputted from the laser chamber 10.

The line narrow module 20 may achieve a desired spectral line width for the laser beam supplied to the exposure device in order to reduce chromatic aberration of the laser beam projected in a reduced manner onto the wafer within the exposure device. Furthermore, the line narrow module 20 may, during operations for calibrating the ultra violet laser device 1, be configured so that a laser beam of a specific wavelength within a predetermined wavelength range is generated, for the purpose of calibration.

As shown as an example in FIG. 6, the line narrow module 20 may include a combination of, for example, a beam expander 201 that uses a prism and a grating 202. The line narrow module 20 is not limited to the example illustrated in FIG. 6, and may include a combination of a grating and a high-reflecting mirror, a prism and a reflective mirror, or an etalon and a high-reflecting mirror. As shown in FIG. 6, in the case where the line narrow module 20 includes a grating, the grating may be disposed through Littrow-arrangement, in which the entry angle and the diffraction angle are the same.

As shown as an example in FIG. 6, in the case where the line narrow module 20 includes the beam expander 201 and the grating 202, a laser resonator may be configured between the grating 202 and the output coupling mirror 13. The output coupling mirror 13 may be a partially-reflecting mirror, and may allow part of the laser beam that resonates within the laser resonator to pass to the beam splitter 23.

The beam splitter 23 may be disposed in the optical path of the laser beam outputted from the output coupling mirror 13. The beam splitter 24 may be disposed in the optical path of the laser beam reflected by the beam splitter 23. The high-reflecting mirror 25 may be disposed in the optical path of the laser beam reflected by the beam splitter 24.

The spectral detector 30 may be disposed in a position where at least part of the laser beam reflected by the beam splitter 23 can enter. The spectral detector 30 may consecutively detect the wavelength of the laser beam outputted from the ultra violet laser device 1 and output the resulting wavelength detection values to the wavelength control unit 50. The wavelength detected by the spectral detector 30 may be an example of the wavelength detection value.

In the example shown in FIG. 7, the spectral detector 30 may include a diffusion element 31, an etalon 32, a light collection lens 33, and an image sensor 34, in that order in the optical path of the entering laser beam. The etalon 32 may be an optical element having a structure in which two optical plates provided with partially-reflective film are disposed opposing each other with a predetermined air gap there between.

The image sensor 34 may be a solid-state image sensor such as a CCD (charge coupled device). A photodiode array may be used instead of the image sensor 34. The spectral detector 30 may include a signal processing unit, not shown, that computes the central wavelength of the laser beam as the wavelength detection value based on the output of the image sensor 34.

The spectral detector 30 may consecutively send the output of the image sensor 34 to the wavelength control unit 50. In this case, the wavelength control unit 50 may consecutively compute the wavelength of the laser beam that has entered into the spectral detector 30 based on the output of the image sensor 34 from the spectral detector 30.

A method for detecting the wavelength of entering light using an etalon is disclosed in, for example, paragraphs 3-6 of Japanese Unexamined Patent Application Publication No. 2003-214958, which is incorporated herein by reference. Accordingly, the method for detecting the wavelength of entering light using an etalon will not be described in detail herein after, but may generally be carried out as follows.

When the entering light diffused by the diffusion element 31 enters into the etalon 32, the light collection lens 33 can form a fringe waveform, which is an interference band, on the light-receiving surface of the image sensor 34 disposed at the position of a focal distance f of the light collection lens 33, based on the principle of the Fabry-Perot interferometer. At this time, a fringe angle, which is an angle formed between the normal line of the partially-reflective surface of the etalon 32 and the optical axis of the entering light, may be computed based on a fringe radius, which is the radius of an image obtained by the image sensor 34, and the focal distance f. A correlation relationship may exist between the fringe angle and the wavelength of the entering light. Accordingly, the spectral linewidth of the laser beam and the central wavelength thereof may be detected based on the fringe waveform.

Note that the spectral detector 30 is not limited to the stated etalon spectroscope, and may be a spectroscope that uses a grating as its wavelength dispersion element.

Referring once again to FIG. 6, the wavelength detector may be the same wavelength detector as that described with reference to FIG. 2.

The wavelength control unit 50 may include a signal processing circuit that has a microprocessor as its primary constituent element. The functions of the wavelength control unit 50 may include the following functions:

(a) a function for receiving, from the laser controller 60, the target value for the wavelength of the laser beam outputted to the exposure device;

(b) a function for controlling the wavelength adjustment unit 70 in accordance with the target value for the wavelength of the laser beam outputted to the exposure device;

(c) a function for causing the wavelength adjustment unit 70 to operate in order to carry out the wavelength calibration process; and (d) a function for calculating a calibration value in response to the wavelength detection value in the spectral detector 30, based on the value outputted by the spectral detector 30 and the value outputted by the wavelength detector 40.

Note that with respect to the function described in (d), the output of the spectral detector 30 may be data indicating the wavelength detection value obtained by the spectral detector 30. The output of the wavelength detector 40 may, for example, be digital data obtained as the output of the AD converter 473 shown in FIG. 4A or FIG. 5A. The calibration value calculation process for computing the calibration value based on the output of the spectral detector 30 and the output of the wavelength detector 40 will be described later.

The laser controller 60 may include a signal processing circuit that has a microprocessor as its primary constituent element. The laser controller 60 may be configured so as to be capable of communicating with a controller of the exposure device, and may have at least the following functions:

(e) a function for receiving, from the controller of the exposure device, the target value for the wavelength of the laser beam to be outputted to the exposure device;

(f) a function for notifying the wavelength control unit 50 of the target value for the wavelength of the laser beam to be outputted to the exposure device;

(g) a function for receiving, from the controller of the exposure device, a calibration instruction signal instructing the execution of wavelength calibration;

(h) a function for causing the power source 11 to supply a required pulsed voltage to the laser chamber 10, cause a pulsed discharge to occur between the electrodes 12 in the laser chamber 10, and cause laser oscillation under a desired oscillation condition to occur;

(i) a function for controlling the shutter driving unit 82 so that the laser beam from the ultra violet laser device 1 is not outputted to the exposure device during the wavelength calibration process; and (j) a function for executing control regarding the starting and stopping of the ultra violet laser device 1 as a whole.

The wavelength adjustment unit 70 may, for the purpose of changing the wavelength of the outputted laser beam, include a rotating stage 72 on which an optical element included in the linen arrow module 20 is mounted in a rotatable state, and an actuator, not shown, for causing the rotating stage 72 to rotate. For example, one of the prisms of the beam expander 201 may be mounted on the rotating stage 72. The angle of the laser beam that enters into the grating 202 may be controlled by rotating the rotating stage 72. The actuator for rotating the stage 72 may, for example, be a stepping motor that rotates the rotating stage 72 at a required rotational resolution. The wavelength adjustment unit 70 may, for example, receive a driving signal indicating the rotational amount of the rotating stage 72 from the wavelength control unit 50, and may then drive the actuator so that the rotating stage 72 rotates by the rotational amount indicated by that driving signal.

The shutter driving unit 82 may include an actuator, not shown, that causes a shutter 82a to operate based on a control signal from the laser controller 60. The shutter 82a may be driven to take on either a position for outputting laser beam that has passed through the beam splitter 23 to the exposure device or a position for preventing the laser beam that has passed through the beam splitter 23 from being outputted to the exposure device. The shutter 82a may be configured of a light-absorbing member that absorbs entering light.

3.2 System Operations

Next, system operations of the wavelength calibration system according to the present embodiment will be described with reference to FIGS. 6 and 8-11.

With the configuration illustrated in FIG. 6, in the case where the laser beam is outputted to the exposure device, the laser controller 60 may notify the wavelength control unit 50 of the target value for the wavelength of the laser beam, which is communicated from the controller of the exposure device. The wavelength control unit 50 may control the rotational amount of the rotating stage 72 in the wavelength adjustment unit 70 so that the difference between the wavelength detection value from the spectral detector 30 and the target value approaches zero. Here, if the accuracy of the wavelength detection value from the spectral detector 30 has not degraded from the initial state, the aforementioned control can be carried out properly. However, in reality, the detection performance of the spectral detector 30 degrades with the passage of time in some case, and thus calibration may be carried out on the wavelength detection value obtained by the spectral detector 30. The causes of such a degradation in the detection performance of the spectral detector 30 can include, for example, the refractive index of a gas present in the air gap of the etalon 32 changing depending on the temperature or pressure of the gas. Paragraphs 7-21 of the aforementioned Japanese Unexamined Patent Application Publication No. 2003-214958 can be referred to for other examples of causes of degradation in the detection performance of the spectral detector 30.

The main routine in the operations performed by the wavelength calibration system illustrated in FIG. 8 may be executed primarily by the laser controller 60.

First, the laser controller 60 may determine whether or not a trigger for carrying out wavelength calibration has occurred (step S10). The timing of the occurrence of a trigger for carrying out wavelength calibration may, for example, be the timing at which the laser controller 60 starts the ultra violet laser device 1, or a timing following the passage of a predetermined amount of time following the previous wavelength calibration. The laser controller 60 may obtain the trigger for carrying out wavelength calibration from the exterior. For example, the timing at which the trigger for carrying out wavelength calibration occurs may be the timing at which the laser controller 60 receives, from the controller of the exposure device, the calibration instruction signal instructing the wavelength to be calibrated. When the stated trigger occurs, the wavelength calibration process may be executed (step S20). An example of the wavelength calibration process may be that indicated in FIG. 9. When the execution of the wavelength calibration ends, the laser controller 60 may determine whether or not to stop the ultra violet laser device 1 (step S30). When the laser beam is being outputted to the exposure device, a determination of "NO" may be made in step S10 of the main routine shown in FIG. 8, and the process for making the determination of "NO" in step S30 may be repeated.

The subroutine for the operations of the wavelength calibration process illustrated in FIG. 9 may be executed primarily by the laser controller 60 or the wavelength control unit 50.

When the trigger for carrying out wavelength calibration occurs, first, the laser controller 60 may set laser oscillation conditions used when carrying out the wavelength calibration in the wavelength control unit 50 (step S200). The laser oscillation conditions used when carrying out the wavelength calibration may, for example, include a charging voltage (kV), a repetition rate (Hz), a wavelength change rate (pm/s), a wavelength range for wavelength scanning (nm), a number of detections in a single wavelength scan corresponding to M in FIG. 10 and mentioned later, and a number of wavelength scans corresponding to N in FIG. 10 and mentioned later. Note that a "wavelength scan" may be an operation for changing the wavelength of the laser beam outputted from the ultra violet laser device 1 in steps during the wavelength calibration. The repetition rate may be a repeating rate at which the laser beam is generated. For example, the repeating rate may be a value within the range of 1500-6000 Hz, and the laser oscillation time may be approximately 1 second.

Next, upon being notified by the laser controller 60 that wavelength calibration will be carried out, the wavelength control unit 50 may carry out a process on the wavelength detector 40 for preparing for the wavelength calibration. In other words, the wavelength control unit 50 may apply a high voltage to the anode in the discharge tube 46 by causing the high-voltage DC power source 471 of the wavelength detector 40 shown in FIG. 4A or 5A to operate. Furthermore, the wavelength control unit 50 may control the reflective mirror driving unit 41 so that the high-reflecting mirror 411 of the wavelength detector 40 is disposed in the non-blocking position (step S210). Through this, the laser beam may enter into the diffusion element 42 from the opening 40a of the wavelength detector 40.

Next, the laser controller 60 may control the shutter driving unit 82 so that the shutter 82a moves to a closed position (step S220). Through this, the laser beam can be prevented from being outputted to the exposure device during the wavelength calibration process. After this, the laser controller 60 may instruct the ultra violet laser device 1 and the wavelength control unit 50 to commence oscillation under the laser oscillation conditions set in step S200 (step S230). As a result, the wavelength control unit 50 may drive the wavelength adjustment unit 70 and cause wavelength scans to be carried out in steps under the conditions set in step S200. While the wavelength scan is being carried out, the calibration value may be calculated by carrying out the calibration value calculation process (step S240). Details regarding the calibration value calculation process will be given later with reference to FIG. 10.

When step S240 ends, the wavelength calibration has essentially ended, and thus the following processing may be carried out. The laser controller 60 may control the ultra violet laser device 1 and the wavelength control unit 50 so that the laser oscillation for wave length calibration is stopped (step S250). Upon being notified by the laser controller 60 that the wavelength calibration has ended, the wavelength control unit 50 may carry out a process for ending the wavelength calibration on the wavelength detector 40. In other words, the wavelength control unit 50 may stop the operations of the high-voltage DC power source 471 in the wavelength detector 40 (see FIG. 4A or FIG. 5A) and stop applying the high voltage to the anode in the discharge tube 46. Furthermore, the wavelength control unit 50 may control the reflective mirror driving unit 41 so that the high-reflecting mirror 411 of the wavelength detector 40 is disposed in the blocking position (step S260). Through this, the laser beam may be prevented from entering into the diffusion element 42 from the opening 40a of the wavelength detector 40. Finally, the laser controller 60 may control the shutter driving unit 82 so that the shutter 82a moves to an open position (step S270). Through this, the laser beam can be outputted to the exposure device.

Note that in the flowchart shown in FIG. 9, in the case where measures for preventing the laser beam from entering into the exposure device during wavelength calibration being provided in the exposure device, the processes of steps S220 and S270 need not be carried out.

The subroutine for the operations of the calibration value calculation process shown in FIG. 10 may primarily be executed by the wavelength control unit 50. In this calibration value calculation process, the ultra violet laser device 1 may be caused to carry out pulsed oscillation when performing a wavelength scan, and the opto-galvanic signal may be obtained with each pulse. At this time, the ultra violet laser device 1 may change the wavelength of the laser beam outputted with each pulse. In the flowchart shown in FIG. 10, M may represent a pulse number of the laser beam assigned to a wavelength range for the wavelength scan. Accordingly, M may represent a number of detections carried out in a single wavelength scan. In the flowchart shown in FIG. 10, N may represent the number of wavelength scans. In other words, the ultra violet laser device 1 may output M×N laser beam pulses in which the wavelength is repeatedly changed in steps, and through this, the wavelength detection value for carrying out wavelength calibration may be made obtain able. In the flowchart shown in FIG. 10, a variable m may be incremented from 0 to M, whereas a variable n may be incremented from 0 to N.

In the flowchart shown in FIG. 10, in step S300, a process for resetting the variables m and n may be carried out. In other words, step S300 may be a process for setting m to 0 and n to 0.

Steps S310 to S340 may correspond to a process by which the wavelength control unit 50 obtains the output of the spectral detector 30 and the output of the wavelength detector 40 in response to a single pulse of laser beam being generated. In other words, the wavelength control unit 50 may control the wavelength adjustment unit 70 so that a single pulse of laser beam is outputted (step S310), and may then increment the variable m (step S320). The wavelength control unit 50 may then obtain the output of the wavelength detector 40, or in other words, an opto-galvanic signal Im obtained by the wavelength detector 40 (step S330). The wavelength control unit 50 may further obtain the output of the spectral detector 30, or in other words, a wavelength detection value λsm obtained by the spectral detector 30 (step S340).

Steps S310 to S340 are repeated until the variable m is incremented up to M (step S350). In other words, the wavelength control unit 50 may obtain the opto-galvanic signal Im and the wavelength detection value λsm for each value of m from 1 to M while changing the wavelength of the outputted laser beam in steps within the wavelength range of the wavelength scan. Through this, in the case where, for example, M=17, 17 plots may be obtained by a single wavelength scan, as indicated by the example shown in FIG. 11, in which the vertical axis represents the opto-galvanic signal Im and the horizontal axis represents the wavelength detection value $\lambda$sm.

Steps S370 to S380 may correspond to a process for specifying a wavelength when the voltage of the opto-galvanic signal is at a maximum or is peaking, based on the M plots obtained through the single wavelength scan. In other words, the wavelength control unit 50 may calculate an approximated curve through the least-squares method based on the M plots of combinations of the opto-galvanic signal Im and the wavelength detection value $\lambda$sm (step S370). FIG. 11 illustrates an example of the approximated curve in the case where M=17. The wavelength control unit 50 may calculate a wavelength $\lambda$sn at the peak of the calculated approximated curve (step S380). The wavelength $\lambda$sn when the voltage of the opto-galvanic signal is peaking may be obtained in a single wavelength scan through the stated processing.

Because the wavelength $\lambda$sn when the voltage of the opto-galvanic signal is peaking can be obtained in a single wavelength scan, the wavelength calibration can be carried out based on the wave length $\lambda$sn. However, for the purpose of increasing the precision of the wavelength calibration, multiple wavelength scans may be carried out, and a process for averaging the wavelengths $\lambda$sn obtained in the respective wavelength scans may be performed. In the flowchart shown in FIG. 10, a process for repeating the processes of steps S310 to S380 may be carried out in order to perform multiple (N, in FIG. 10) wavelength scans (steps S360, S390, and S400). N may be any value greater than or equal to 2, and may, for example, be 30.

Steps S410 and S420 may correspond to a process for averaging the wavelengths $\lambda$sn obtained during the N wavelength scans and calculating a calibration value for the wavelength detection value obtained by the spectral detector 30.

In other words, the wavelength control unit 50 may calculate an average value $\lambda$sav of the wavelengths $\lambda$sn obtained through the N wavelength scans (step S410). In other words, the N wavelengths $\lambda$s1, $\lambda$s2, and so on up to $\lambda$sN may be averaged and the obtained average value may then be taken as the average value $\lambda$sav. The average value $\lambda$sav may reflect the wavelength, obtained through the N wavelength scans, occurring when the level of the opto-galvanic signal is at a maximum. Meanwhile, an absolute wavelength $\lambda$abs of the laser beam when the level of the opto-galvanic signal is at a maximum may be a known value based on the metal material that configures the cathode in the discharge tube 46. For example, as mentioned earlier, if the metal material that configures the cathode in the discharge tube 46 is platinum, $\lambda$abs may be 193.4369 nm. Accordingly, the wavelength control unit 50 may calculate $\Delta\lambda$abs, which represents a difference between $\lambda$abs and $\lambda$sav, as the calibration value for the wavelength detection value obtained by the spectral detector 30 (step S420).

The wavelength $\lambda$sn is calculated through a wavelength scan in the flowchart shown in FIG. 10, and the reason that carrying out a wavelength scan is preferable may be as follows. The following risk is present in the case where opto-galvanic signal data and wavelength detection value data are obtained by continuously outputting N pulses of laser beam of a specific wavelength, and thereafter changing the wavelength and obtaining the data in the same manner by repeating these operations M times. Results of research carried out by the inventors indicate that there are cases, in a Laser Galvatron® type discharge tube that can be used in the wavelength detector 40, where the signal strength gradually drops if the wavelength of the entering laser beam is held constant. Accordingly, there is the chance that precise data cannot be obtained if the data continues to be obtained in a state in which the wavelength of the laser beam outputted from the ultra violet laser device 1 is constant. Accordingly, when obtaining data from the wavelength detector 40 that uses the stated discharge tube, wavelength scans that sequentially change the wavelength over a comparatively short period may be executed. This makes it possible to increase the precision with which the calibration value is calculated. Note that when multiple wavelength scans are performed, the wavelength changes in the wavelength scan may be caused to proceed from a minimum wavelength value, to a maximum wavelength value, to a minimum wavelength value, and so on, in order to reduce the time required for wavelength calibration.

When the calibration value has been calculated for the wavelength detection value obtained by the spectral detector 30 through the wavelength calibration process described thus far, the wavelength control unit 50 may perform a process for adding the calculated calibration value to the wavelength detection value obtained by the spectral detector 30. In other words, in the case where the wavelength detection value of the spectral detector 30 is $\lambda$s0, the wavelength control unit 50 may calculate a post-calibration wavelength detection value $\lambda$s through the operation $\lambda$s=$\lambda$s0+$\Delta\lambda$abs. Through this, the wavelength control unit 50 can precisely identify the wavelength of the laser beam outputted from the ultra violet laser device 1 to the exposure device. Accordingly, assuming that the difference between the target value for the wavelength instructed by the exposure device and the wavelength of the outputted laser beam represents error, the wavelength control unit 50 can control the ultra violet laser device so that the error approaches zero.

Although FIG. 6 illustrates a single-stage ultra violet laser device, it should be noted that the configuration of the laser device to which the technique of the present disclosure is applied is not limited to this configuration. The technique of the present disclosure may be applied in a two-stage laser apparatus configured of an oscillation-stage laser and an amplification stage that amplifies the laser beam outputted from the oscillation-stage laser. The two-stage laser apparatus may, for example, be a MOPA (Master Oscillator Power Amplifier) or MOPO (Master Oscillator Power Oscillator) type laser device.

As described earlier, according to the embodiment of the wavelength detector 40 included in the wavelength calibration system, an optical system may be configured so that the entering laser beam for wavelength calibration passes through the through-hole of a cathode in a discharge tube without directly irradiating the cathode. In addition, according to the embodiment of the wavelength detector 40 included in the wavelength calibration system, a signal processing unit may be provided so that, even in the case where a signal in which an opto-galvanic signal and a photoelectric effect signal overlap is observed, the opto-galvanic signal can be identified from the observed signal. A highly-precise calibration value may be calculated by the wavelength calibration system by the optical system and/or the signal processing unit precisely obtaining the level of the opto-galvanic signal in the wavelength detector 40.

The description above is not intended to be limiting, but only to provide examples. It is clear for the skilled person that various changes and modifications can be made in the embodiments in this disclosure without departing from the spirit and scope of the appended claims.

The terms used in this specification and the appended claims should be construed as non-limiting. For example, the terms "comprise" and "include" should be construed as "include but not be limited to." The term "have" should be construed as "have but not be limited to." The indefinite article "a/an" used in this specification and the appended claims should be construed as "at least one" or "one or more."

What is claimed is:

1. A wavelength detector that detects a wavelength of a laser beam outputted from an ultra violet laser device, the wavelength detector comprising:
a discharge tube that includes a cylindrical anode and a cylindrical cathode that each have a through-hole formed therein, and that is configured so that an electrical property between the anode and the cathode changes due to an opto-galvanic effect when a laser beam having a predetermined first wavelength passes through the through-hole of the cathode in a state in which a DC voltage is applied to the anode;
a high-voltage DC power source configured so as to apply the DC voltage to the anode;
an electrical signal processing unit including an electrical signal detection point for detecting a voltage change in a signal level of the cathode; and
a dumper provided downstream from the discharge tube in an optical path of the laser beam and configured to absorb the laser beam that has passed through the discharge tube,
wherein the electrical signal processing unit includes at least one of
an electrical low-pass filter connected to the electrical signal detection point for suppressing a voltage level of a photoelectric effect signal produced when the cathode is irradiated with the laser beam and
an electrical delay circuit that delays an electrical signal detection timing of the voltage level in the electrical signal detection point by a predetermined amount of time in order to start the electrical signal detection of the voltage level at least after the voltage peak of the photoelectric effect signal in the electrical signal detection point, and
wherein the electrical signal processing unit detects the voltage change in the electrical property.

2. A wavelength calibration system comprising:
an ultra violet laser device;
a wavelength control unit that changes a wavelength of a laser beam outputted from the ultra violet laser device in steps within a predetermined wavelength range;
a first wavelength detector that is the wavelength detector according to claim 1; and
a second wavelength detector that consecutively detects wavelengths of the laser beams outputted from the ultra violet laser device,
wherein the wavelength control unit calculates a calibration value for a wavelength detection value detected by the second wavelength detector based on a difference between the predetermined first wavelength that is a wavelength based on a material of the cathode, and the wavelength detection value that is a wavelength detected by the second wavelength detector when the electrical property of the discharge tube changes.

3. The wavelength detector according to claim 1, wherein the signal detection timing is delayed for a predetermined amount of time following a timing at which the voltage level observed in the electrical signal detection point has exceeded a predetermined voltage value of a reference voltage; and the predetermined amount of time and the predetermined voltage value of the reference voltage are determined beforehand.

4. The wavelength detector according to claim 3, wherein the delay circuit includes:
a comparator configured to compare the predetermined voltage value of the reference voltage at the signal detection point with the reference voltage, and to output a logic signal based on a result of the comparison; and
a delay element configured to delay the logic signal inputted from the comparator by the predetermined delay time and output a delayed signal.

5. The wavelength detector according to claim 4, wherein the predetermined delay time is a time spanning from when the voltage level at the signal detection point exceeds the predetermined voltage value of the reference voltage to when a voltage peak of an opto-galvanic signal changing in response to the change in the electrical property occurs.

6. The wavelength detector according to claim 4, wherein the predetermined delay time is a time spanning from when the voltage level at the signal detection point exceeds the predetermined voltage value of the reference voltage to when the voltage level drops below the predetermined voltage value of the reference voltage.

7. The wavelength detector according to claim 1, wherein the dumper has a structure in which multiple light-absorbing members are disposed opposing each other with their absorption surfaces facing inward.

8. The wavelength detector according to claim 1, wherein the dumper is connected to a cooling apparatus.

9. The wavelength detector according to claim 1, further comprising:
a diffusion element that diffuses the laser beam outputted from the ultra violet laser device;
a light collection optical system provided downstream from the diffusion element;
a member, including an aperture, provided downstream from the light collection optical system; and
a transfer optical system including a first lens and a second lens, provided downstream from the member, that transfers an image in the aperture;
wherein the discharge tube is provided downstream from the member.

10. The wavelength detector according to claim 9, wherein the discharge tube is disposed so that the laser beam that passes through the aperture passes through the through-hole of the cathode of the discharge tube without directly irradiating the cathode,
wherein the discharge tube is disposed so that the image in the aperture transferred by the transfer optical system is formed within the through-hole of the cathode,
wherein the first lens is disposed so that an upstream focal position of the first lens is positioned in a center of the aperture,
wherein the second lens is disposed so that a downstream focal position of the second lens is located within the through-hole of the cathode in the discharge tube,
and wherein the inner diameter D of the through hole of the cathode fulfills the below equation:

$$D > \phi(NAo/NAi) + L \tan(\theta i)$$

wherein $\phi$ is a diameter of the aperture, NAo is a numerical aperture of the first lens, NAi is a numerical aperture of the second lens, L is a width of the cathode in the discharge tube, and θi is a entry angle of the laser beam relative to a center axis of the cylindrical cathode.

11. A wavelength detector that detects a wavelength of a laser beam outputted from an ultra violet laser device, the wavelength detector, comprising:
   a diffusion element that diffuses the laser beam;
   a light collection optical system provided downstream from the diffusion element;
   a member, including an aperture, provided downstream from the light collection optical system;
   a transfer optical system including a first lens and a second lens, provided downstream from the member, that transfers an image in the aperture;
   a discharge tube that is provided downstream from the member and that includes a cylindrical anode and a cylindrical cathode that each have a through-hole formed therein, and that is configured so that an electrical property between the anode and the cathode changes due to an opto-galvanic effect when the laser beam having a predetermined first wavelength passes through the through-hole of the cathode in a state in which a DC voltage is applied to the anode;
   a high-voltage DC power source configured so as to apply a DC voltage to the anode; and
   a dumper provided downstream from the discharge tube in the optical path of the laser beam and configured to absorb the laser beam that has passed through the discharge tube,
   wherein the discharge tube is disposed so that the laser beam that passes through the aperture passes through the through-hole of the cathode of the discharge tube without directly irradiating the cathode,
   wherein the discharge tube is disposed so that the image in the aperture transferred by the transfer optical system is formed within the through-hole of the cathode,
   wherein the first lens is disposed so that an upstream focal position of the first lens is positioned in a center of the aperture,
   wherein the second lens is disposed so that a downstream focal position of the second lens is located within the through-hole of the cathode in the discharge tube, and
   wherein the inner diameter D of the through hole of the cathode fulfills the below equation:

$$D > \phi(NAo/NAi) + L\tan(\theta i)$$

wherein $\phi$ is the diameter of the aperture, NAo is a numerical aperture of the first lens, NAi is a numerical aperture of the second lens, L is a width of the cathode in the discharge tube, and θi is an entry angle of the laser beam relative to a center axis of the cylindrical cathode.

12. A wavelength calibration system, comprising:
   an ultra violet laser device;
   a wavelength control unit that changes a wavelength of a laser beam outputted from the ultra violet laser device in steps within a predetermined wavelength range;
   a first wavelength detector that is the wavelength detector according to claim 11; and
   a second wavelength detector that consecutively detects wavelengths of the laser beams outputted from the ultra violet laser device,
   wherein the wavelength control unit calculates a calibration value for a wavelength detection value detected by the second wavelength detector based on a difference between the predetermined first wavelength that is a wavelength based on the material of the cathode, and the wavelength detection value that is a wavelength detected by the second wavelength detector when the electrical property of the discharge tube changes.

13. The wavelength detector according to claim 11, wherein the dumper has a structure in which multiple light-absorbing members are disposed opposing each other with their absorption surfaces facing inward.

14. The wavelength detector according to claim 11, wherein the dumper is connected to a cooling apparatus.

15. A wavelength detector that detects a wavelength of a laser beam outputted from an ultra violet laser device, the wavelength detector comprising:
   a diffusion element that diffuses the laser beam;
   a light collection optical system provided downstream from the diffusion element;
   a member, including an aperture, provided downstream from the light collection optical system;
   a discharge tube that is provided downstream from the member and that includes a cylindrical anode and a cylindrical cathode that each have a through-hole formed therein, and that is configured so that an electrical property between the anode and the cathode changes due to an opto-galvanic effect when a laser beam having a predetermined first wavelength passes through the through-hole of the cathode in a state in which a DC voltage is applied to the anode;
   a high-voltage DC power source configured so as to apply the DC voltage to the anode; and
   a dumper provided downstream from the discharge tube in an optical path of the laser beam and configured to absorb the laser beam that has passed through the discharge tube,
   wherein the discharge tube is disposed so that the laser beam that passes through the aperture passes through the through-hole of the cathode of the discharge tube without directly irradiating the cathode.

16. The wavelength detector according to claim 15, wherein the dumper has a structure in which multiple light-absorbing members are disposed opposing each other with their absorption surfaces facing inward.

17. The wavelength detector according to claim 15, wherein the dumper is connected to a cooling apparatus.

18. The wavelength detector according to claim 15, further comprising:
   a transfer optical system, provided downstream from the member, that transfers an image in the aperture,
   wherein the discharge tube is disposed so that the image in the aperture transferred by the transfer optical system is formed within the through-hole of the cathode.

19. The wavelength detector according to claim 18, wherein the discharge tube is disposed so that the image in the aperture is formed on a center axis of the through-hole of the cathode.

20. The wavelength detector according to claim 15, wherein the diffusion element is at least one of a micro flys-eye lens and a diffractive optics element.

* * * * *